(12) United States Patent
Kimia et al.

(10) Patent No.: US 8,428,317 B2
(45) Date of Patent: Apr. 23, 2013

(54) BINNED MICRO-VESSEL DENSITY METHODS AND APPARATUS

(75) Inventors: Benjamin Kimia, Providence, RI (US); Raul A. Brauner, Framingham, MA (US); John Heymach, Pearland, TX (US); Jesse Funaro, Providence, RI (US)

(73) Assignee: Bio-Tree Systems, Inc., Framingham, MA (US)

( * ) Notice: Subject to any disclaimer, the term of this patent is extended or adjusted under 35 U.S.C. 154(b) by 683 days.

(21) Appl. No.: 12/308,908

(22) PCT Filed: Jun. 28, 2007

(86) PCT No.: PCT/US2007/015048
§ 371 (c)(1),
(2), (4) Date: Mar. 9, 2010

(87) PCT Pub. No.: WO2008/002648
PCT Pub. Date: Jan. 3, 2008

(65) Prior Publication Data
US 2010/0159497 A1    Jun. 24, 2010

Related U.S. Application Data

(60) Provisional application No. 60/817,658, filed on Jun. 28, 2006.

(51) Int. Cl.
*G06K 9/00* (2006.01)
(52) U.S. Cl.
USPC .......................................... 382/128; 600/300

(58) Field of Classification Search ........... 382/128–132
See application file for complete search history.

(56) References Cited

U.S. PATENT DOCUMENTS 5,757,877 A * 5/1998 Wilting ............................. 378/8
5,872,861 A * 2/1999 Makram-Ebeid ............. 382/130
(Continued)

OTHER PUBLICATIONS

I. Troprès, L. Lamalle, M. Péoc'h, R. Farion, Y. Usson, M. Décorps, and C. Rémy, "In Vivo Assessment of Tumoral Angiogenesis," *Magnetic Resonance in Medicine, Journal of the Society of Magnetic Resonance in Medicine*, Mar. 2004, pp. 533-541, vol. 51, No. 3.

(Continued)

*Primary Examiner* — Manav Seth
(74) *Attorney, Agent, or Firm* — Wolf, Greenfield & Sacks, P.C.

(57) ABSTRACT

In one aspect, a method of obtaining micro-vessel density (MVD) measurements from an image of biological vasculature containing a plurality of vessels is provided. The method comprises acts of analyzing a region of interest of the image for each of a plurality of bins, each of the plurality of bins associated with a predetermined range of vessel sizes, the act of analyzing the region of interest including determining which of the plurality of bins that portions of any vessel subject matter identified in the region of interest belong based on a size associated with the respective portions of the vessel subject matter, and associating each portion of the vessel subject matter with the corresponding one of the plurality of bins to which the portion belongs, and computing at least one measurement for each of the plurality of bins, the at least one measurement related to the MVD of the portions of vessel subject matter associated with the respective bin.

24 Claims, 13 Drawing Sheets

U.S. PATENT DOCUMENTS

| | | | |
|---|---|---|---|
| 6,817,982 B2 * | 11/2004 | Fritz et al. ................. 600/443 |
| 6,993,170 B2 * | 1/2006 | Johnson et al. ............. 382/128 |
| 6,996,260 B1 * | 2/2006 | Skands et al. .............. 382/128 |
| 6,998,418 B1 * | 2/2006 | Sung et al. .................. 514/456 |
| 7,113,623 B2 * | 9/2006 | Chen et al. .................. 382/128 |
| 7,203,353 B2 * | 4/2007 | Klotz et al. ................. 382/131 |
| 7,233,330 B2 * | 6/2007 | Moreau-Gobard et al. .. 345/424 |
| 7,272,250 B2 * | 9/2007 | Schneider et al. ........... 382/128 |
| 7,397,937 B2 * | 7/2008 | Schneider et al. ........... 382/130 |
| 7,492,934 B2 * | 2/2009 | Mundy et al. ................ 382/128 |
| 7,546,154 B2 * | 6/2009 | Hornegger et al. .......... 600/407 |
| 8,090,164 B2 * | 1/2012 | Bullitt et al. ................ 382/128 |
| 2002/0090121 A1 * | 7/2002 | Schneider et al. ........... 382/128 |
| 2003/0050553 A1 | 3/2003 | Samoszuk et al. |
| 2005/0171616 A1 * | 8/2005 | Sung et al. ................ 623/23.72 |
| 2006/0184037 A1 * | 8/2006 | Ince et al. ................... 600/476 |
| 2007/0269845 A1 * | 11/2007 | Bjerkvig ....................... 435/29 |
| 2008/0221441 A1 * | 9/2008 | Bjornerud et al. ........... 600/425 |
| 2009/0005693 A1 * | 1/2009 | Brauner et al. .............. 600/481 |
| 2009/0328239 A1 * | 12/2009 | Brauner et al. ................. 800/3 |
| 2011/0103657 A1 * | 5/2011 | Kang et al. .................. 382/128 |

OTHER PUBLICATIONS

International Search Report and Written Opinion for International Application No. PCT/US2007/015048 mailed Mar. 20, 2008.

F. Cassot et al., "A Novel Three-Dimensional Computer-Assisted Method for a Quantitative Study of Microvascular Networks of the Human Cerebral Cortex," *Microcirculation*, Jan. 2006, pp. 1-18, vol. 13, No. 1.

European Examination Report for Application No. 07 796 551.5-2218 dated Nov. 11, 2010.

* cited by examiner

BINNED MICRO-VESSEL DENSITY METHODS AND APPARATUS

RELATED APPLICATION

This application claims priority under 35 U.S.C. §119(e) to U.S. Provisional Application Ser. No. 60/817,658, entitled "BINNED-MICRO-VESSEL DENSITY METHODS AND APPARATUS," filed on Jun. 28, 2006, which is herein incorporated by reference in its entirety.

FIELD OF INVENTION

The present invention relates to determining characteristics of vessels in a tissue sample (e.g., an image of a portion of vasculature), and more particularly, to computing one or more micro-vessel density (MVD) measurements.

BACKGROUND

Micro-vessel density (MVD) has been used to assess the efficacy of various treatments for cancerous tumors. In particular, the number of vessels identifiable in a particular region of an X-ray image or visible in a slice of tissue using a confocal microscope may be used to characterize the region of tissue. For example, certain anti-angiogenic drugs work to prevent the creation of micro-vessels necessary for a tumor to survive and/or grow. MVD measurements are often used to determine whether the growth of a tumor is being adequately slowed, reduced in size, eradicated, etc., using a particular anti-angiogenic drug. The MVD measurements may, for example, facilitate characterization of the morphological changes taking place over time in a tumor in response to a particular treatment.

Conventional MVD methods are often based on one of two different techniques. In a first technique, the total number of vessels identifiable in a particular region are counted to determine the vessel density. This counting procedure is typically achieved by having a specialist trained in such techniques examine a vascular region (e.g., an image of the vasculature of biological tissue) and manually count the vessels that appear in a region of interest, for example, a hotspot that is likely associated with a tumor or other collection of vessels anomalous to the particular tissue. The term "hotspot" refers generally to a region of tissue identified as having a relatively high concentration of blood vessels as compared to the surrounding tissue. Hotspots often identify or are otherwise linked to the presence of a tumor or other biological anomaly.

In a second technique, a ratio is computed between the total vascular area and the total area of the region of tissue (e.g., the total area of a hotspot). This method is often referred to as the total vascular area (TVA). As with the vessel count method, TVA measurements are often achieved by manual examination by a skilled specialist, such as a physician. The two methods provide vessel information that facilitates assessing tumor changes over time, aiding the physician in diagnosing and/or treating a patient.

SUMMARY

Aspects of the invention relate to analyzing tubular body structures. In some embodiments, one or more structural parameters are analyzed for a plurality of tubular structures that have been sorted into bins based on their size (e.g., their diameter). Aspects of the invention may increase the analytical resolution when evaluating structural information that is obtained from one or more imaging or scanning techniques.

According to aspects of the invention, a binned structural analysis refers to any analysis of tubular structures that have been sorted or categorized according to size (e.g., according to the diameter or radius of the tubular structure in an area of interest). For example, in some embodiments a binned micro-vessel density (BMVD) analysis refers to an analysis of blood vessel density based on blood vessels that have been categorized according to vessel diameter in an area of interest.

Binned analytical techniques can be applied to the analysis of many different parameters that may be characteristic of tubular structures. For example, bins of tubular structures having different diameters can be evaluated to determine one or more of the following parameters: tortuosity, curvature, density, branching frequency, branching hierarchy (e.g., presence or absence of a branching hierarchy), relative distribution and/or direction of tubular structures (e.g., blood vessels), etc., or any combination thereof. By performing the analysis on binned data, small changes that primarily affect structures in one size range are more likely to be detected, because they are not masked by a relative absence of change in structures in other size ranges. Accordingly, methods of the invention can be used to refine an analysis of tubular structures (e.g., blood vessels) over time or in response to disease or treatment, etc. Aspects of the invention can also be used to detect or delineate diseased tissue (e.g., cancerous or pre-cancerous tissue, necrotic regions, etc.).

Some embodiments include a method of obtaining micro-vessel density (MVD) measurements from an image of biological vasculature containing a plurality of vessels, the method comprising acts of analyzing a region of interest of the image for each of a plurality of bins, each of the plurality of bins associated with a predetermined range of vessel sizes, the act of analyzing the region of interest including determining which of the plurality of bins that portions of any vessel subject matter identified in the region of interest belong based on a size associated with the respective portions of the vessel subject matter, and associating each portion of the vessel subject matter with the corresponding one of the plurality of bins to which the portion belongs, and computing at least one measurement for each of the plurality of bins, the at least one measurement related to the MVD of the portions of vessel subject matter associated with the respective bin.

Some embodiments include a method of automatically obtaining micro-vessel density (MVD) measurements from an image of biological vasculature containing a plurality of vessels, the method comprising acts of automatically identifying a plurality of vessel regions in a region of interest of the image, automatically determining a vessel size associated with each of the plurality of vessel regions, automatically associating each of the plurality of vessel regions with one of a plurality of bins based on the vessel size associated with the respective vessel region, and automatically computing, for each of the plurality of bins, at least one measurement associated with the MVD of vessel regions associated with the respective bin.

Some embodiments include a computer readable medium encoding instructions capable of being executed on one or more processors, the instructions, when executed, performing a method of automatically obtaining micro-vessel density (MVD) measurements from an image of biological vasculature containing a plurality of vessels, the method comprising acts of automatically identifying a plurality of vessel regions in a region of interest of the image, automatically determining a vessel size associated with each of the plurality of vessel regions, automatically associating each of the plurality of vessel regions with one of a plurality of bins based on the vessel size associated with the respective vessel region, and automatically computing, for each of the plurality of bins, at least one measurement associated with the MVD of vessel regions associated with the respective bin.

Accordingly, aspects of the invention provide methods and devices for obtaining and/or analyzing data relating to internal tubular structures in human and other animal bodies. In some embodiments, methods of the invention involve analyzing one or more parameters (or parameter changes over time) for binned blood vessels that have been categorized based on their size. For example, blood vessels may be binned according to the following non-limiting diameter ranges: about 0-10 microns, about 10-25 microns, about 25-50 microns, about 50-75 microns, about 75-100 microns, about 100-150 microns, about 150-200 microns, about 200-300 microns, about 300-400 microns, about 400-500 microns, about 500-1,000 microns, or any combination thereof. However, any other suitable bin size ranges (including larger, smaller, or intermediate size ranges) may be used. In some embodiments, the number of different bins may be between about 2 and about 10. However, higher numbers of bins also may be used. In some embodiments, only 2 to 5 bins are used (e.g., 2, 3, 4, or 5). In certain embodiments, three blood vessel bin sizes are used: small, medium, and large. In some embodiments, a single bin is chosen having a predetermined size range and no other size ranges are analyzed.

Data relating to one or more selected in situ structures may be obtained and/or analyzed to glean information about a physiological condition of an animal based on the structure (or changes in the structure). Structural information may be used for diagnostic, predictive, prognostic, therapeutic, interventional, research and/or development purposes, as well as for grading and/or staging a disease. In some embodiments, methods of the invention may involve analyzing one or more structural parameters (or one or more structural parameter changes over time) based on binned in situ structure data or information. Methods of the invention may be automated. In some embodiments, methods of the invention involve detecting angiogenesis and/or changes in patterns of angiogenesis within a subject.

Aspects of the invention relate to business methods that may involve the marketing and/or licensing of biomarkers associated with particular biological processes, conditions, and/or diseases. In some embodiments, patterns (e.g., geometric features) of binned blood vessels are analyzed to identify or evaluate associations or correlations with certain biological processes, conditions, and/or diseases of interest. Pattern parameters may be identified that can be used as structural biomarkers (e.g., for clinical, diagnostic, therapeutic, and/or research applications as described herein). These biomarkers may be used to reduce the cost and increase the efficiency and sensitivity of medical and research techniques. In one embodiment, one or more biomarkers or methods of using the biomarkers may be marketed to medical or research customers or potential customers. In one embodiment, a fee-based service may be provided to medical or research organizations wherein information relating to a medical image is obtained and analyzed for the presence of one or more biomarkers and the resulting information is returned in exchange for a fee. The amount of the fee may be determined, at least in part, by the type of image information that is provided, the type and degree of analysis that is requested, and the format and timing of the analysis. It should be understood that aspects of the invention may be applicable to image information obtained from one or more of many different scanning modalities (including, but not limited to, micro CT, MDCT, rotational angiography, MRI, PACS). This information may be received from many different sources, including, but not limited to one or more of the following: medical centers, large pharmaceutical companies (e.g., in association with pre-clinical evaluations or during clinical trials), CROs (for both pre-clinical and clinical analyses), medical laboratories and practices (e.g., scanning centers), hospitals, clinics, medical centers, small biotechnology companies (e.g., in association with pre-clinical evaluations or during clinical trials), and bio-medical research organizations. The results of the analysis then may be returned to any one of these organizations. In some embodiments, the analysis results may be returned to the same entity that sent the image information. In other embodiments, the results may be returned to a different entity (e.g., the image information may be received from a scanning laboratory and the analysis may be returned to a physician). One or more steps involved with receiving the information, analyzing the structural features, processing the results and forwarding the results to a recipient may be automated. It also should be appreciated that one or more of these steps may be performed outside the United States of America. Business procedures (e.g., marketing, selling, licensing) may be performed individually or collaboratively.

Aspects of the invention may be described herein in the context of individual analytical steps, particular structural features, etc. However, it should be appreciated that any of the methods and devices described herein also may be incorporated into a business method associated with the use of a biomarker based on one or more blood vessel structural features or patterns.

Aspects of the invention relate to detecting and analyzing pattern parameters of in situ tubular structures (e.g., parameters of a subject's in situ vasculature). Aspects of the invention may be automated (e.g., using one or more computer-implemented acts described herein). It should be appreciated that one or more pattern parameters (e.g., individual blood vessel structural feature(s), distributions of blood vessels or blood vessel structural features, or combinations thereof) may be analyzed for binned data using one or more quantitative and/or qualitative methods. In some embodiments, one or more parameters may be measured and quantified and the measurements may be analyzed using standard quantitative and/or statistical techniques for evaluation and/or comparison with threshold or reference values as described herein. In certain embodiments, one or more parameters may be evaluated using a predetermined scoring method (e.g., based on predetermined factors) for binned data. Geometrical parameters may be represented using vectors. For example, a distribution of blood vessels, blood vessel curvatures, blood vessel tortuosity, or blood vessel directions within a volume of interest may be represented using a plurality of vectors. Separate vectors may be used to represent separate vessels (e.g., vessels for which a connectivity has not been determined during the analysis). However, separate vectors also may be used to represent individual segments or fragments of a single blood vessel or portion of a vascular tree (e.g., for which connectivity has been or may be determined during the analysis). Vasculature pattern parameters may be analyzed using any appropriate technique for separating and/or categorizing numerical values or scores.

In some embodiments, a score may be obtained to relate a pattern parameter to the probability of a physiological condition such as a disease or a stage of a disease. Aspects of the invention can be used for in situ diagnostic, interventional and therapeutic analysis of one or more disease loci associated with aberrant internal structures. As used herein "in situ" means in an animal (e.g., a human) body as opposed to in a biopsy or other tissue sample. Aspects of the invention can be used to research structural changes associated with a disease, for developing and evaluating disease treatments including therapeutic drugs, and for other purposes. Aspects of the invention include automatically analyzing a structural feature or pattern and automatically generating a score based on the analysis.

In some embodiments, aspects of the invention include detecting and/or analyzing selected internal tubular networks in animals. As used herein, an internal tubular network means a network of connected cylindrical internal body structures. Tubular networks include, but are not limited to, cardio-vascular, respiratory, gastro-intestinal, and genito-urinary systems and portions thereof within animal bodies. Accordingly, the cylindrical structures may include branched, straight, curved, and/or twisted cylindrical elements. The cylindrical structures and elements may include not only cylinders, but also may include flattened or otherwise distorted regions. The cross-section of a cylindrical structure or element may be circular, oval, approximately circular, approximately oval, or more irregular in nature. The internal diameter of the cylindrical elements may vary or may be approximately the same over the region of interest. A tubular network such as a circulatory network may be closed off from the environment outside the animal. In contrast, tubular networks such as respiratory and gastro-intestinal networks may be open to the outside environment.

Tubular structures (e.g., blood vessels) of different size ranges may be analyzed separately and compared to different threshold or reference values as described herein. In some embodiments, one or more structural parameters are obtained (e.g., calculated or modeled, etc.) for only a subset of the binned size ranges (e.g., only for those size ranges for which changes are known to be associated with a diagnostic, prognostic, clinical, or research application of interest). However, in certain embodiments, all of the binned size ranges are analyzed. In some embodiments, one or more different parameters are analyzed for different size ranges. However, in certain embodiments, the same parameter(s) is/are analyzed for all of the binned size ranges that are being assayed. Binned analyses may be provided in the form of histograms or curves representing a distribution of numerical values or scores obtained for the different bin ranges.

Certain aspects of the invention are described in more detail in the following sections including the Examples and Figures. It should be appreciated that analytical techniques used to categorize blood vessels based on size may be used to categorize other tubular body structures based on size. Once the tubular structures (e.g., blood vessels) are categorized based on size, the associated values or scores obtained for different parameters of interest can also be categorized and analyzed. Aspects of this categorization and analysis may be automated, for example, as described herein.

DETAILED DESCRIPTION

As discussed herein, there are two general methods of computing micro-vessel density; 1) counting the total number of vessels visible in a tissue region of interest (ROI) or hotspot; and 2) determining the ratio of the total vascular area to the total area of the ROI or hotspot. Applicant has recognized that methods of performing conventional MVD may have significant drawbacks. Vessel counting tends to overemphasize the role of capillaries and other relatively small vessels. In particular, both capillaries (and other small vessels) and relatively large vessels both contribute a single increment to the total vessel count, despite the fact that the larger vessels may occupy a substantial majority of a hotspot area.

Conventional TVA, by contrast, tends to overemphasize the role of large vessels. For example, a single artery may contribute the same weight to the TVA measurement as a thousand capillaries. When the TVA count is employed to determine angiogenic characteristics, this large artery bias tends to obscure changes occurring at small vessel sizes, reducing the information content available in the measurement. For example, significant changes in capillary area may go unnoticed because the total vessel area is comprised largely of the contribution from the larger vessels. In some cases, this change in small vessel area that is missed by conventional TVA is important, rendering the conventional TVA measurement ineffective.

Applicant has appreciated that various shortcomings of conventional MVD approaches may be resolved by performing one or more binned micro-vessel density (BMVD) operations or measurements. The term binned micro-vessel density or BMVD refers to any MVD measurement scheme in which the measurements are determined based on vessels that have been categorized according to vessel size. In particular, a BMVD operation may be performed by analyzing a region of interest separately for at least two different vessel sizes and/or ranges of vessel sizes.

Figure 1:
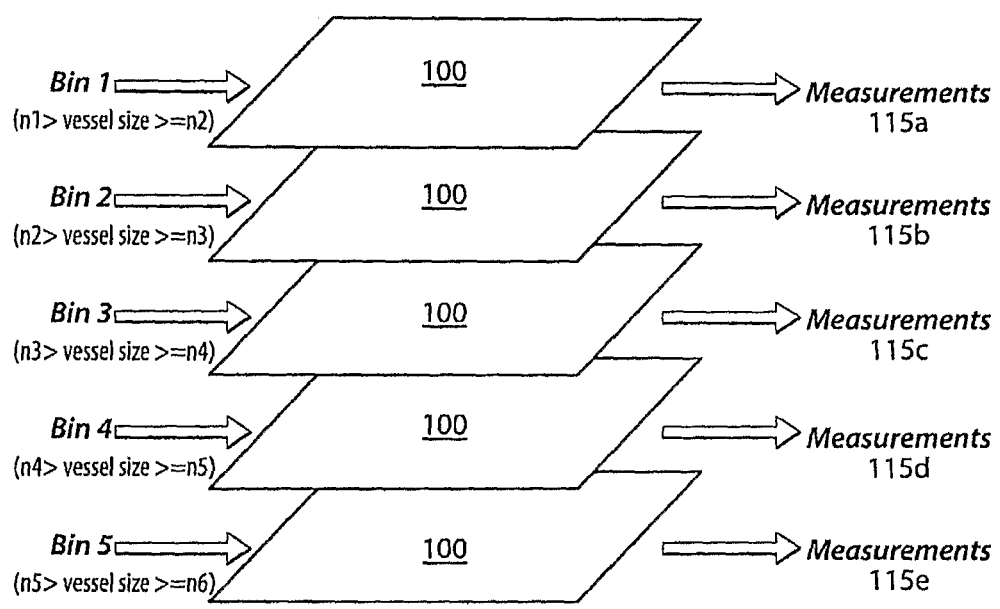
FIG. 1 illustrates a method of performing one or more BMVD measurements, in accordance with some embodiments of the present invention.

FIG. 1 illustrates a method of performing one or more BMVD measurements, in accordance with some embodiments of the present invention. A cross-section of tissue for which BMVD is desired is obtained from a subject. The cross-section may be a slice of tissue to be observed under a microscope or may be a 2D image of the tissue cross-section, for example, obtained using an X-ray scanning device. In FIG. 1, the obtained cross-section is represented schematically by cross-section 100. Cross-section 100 is analyzed for each of a plurality of bins (e.g., bins 1-5). Each bin is associated with a particular range of vessel sizes. A measurement 115 is obtained for each respective bin, the measurement being one or more numbers, values and/or properties associated with vessels in the size range corresponding to each respective bin. It should be appreciated that cross-section 100 may be a cross-section including one or more regions of interest or may represent the region of interest itself (e.g., as segmented from a larger image or cross-section of tissue).

According to some embodiments, cross-section 100 is analyzed by counting the total number of vessels in each size range for respective bins in the bin hierarchy. For example, for bin 1, all vessels having a radius greater than or equal to $n_2$ and less than $n_1$ are counted to generate measurement 115a. For bin 2, all vessels having a radius greater than or equal to $n_3$ and less than $n_2$ are counted to generate measurement 115b, and so on down through the bin hierarchy. In the embodiment of FIG. 1, $n1 > n2 = n3 > n4 = n5 > n6 = n7 > n8 = n9 > n10$. However, it should be appreciated that any numbers may be used to define the range assigned to each respective bin. In addition, the ranges need not be of equal size. For example, Table 1 below illustrates exemplary values for a bin hierarchy according to some embodiments of the present invention.

TABLE 1

| Bin | Vessel Radius |
|---|---|
| 1 | 180-500 μm |
| 2 | 75-180 μm |
| 3 | 30-75 μm |
| 4 | 12-30 μm |
| 5 | 5-12 μm |

In other embodiments, BMVD is used to improve conventional TVA methods. In particular, for each bin, the total area of the vessels of the associated size range may be computed. The vessel area computation alone, or in comparison to the non-vessel area (e.g., a ratio between total vessel and non-vessel area) may be provided as measurements 115 for each respective bin. Other vessel area computations for vessels of the appropriate size for each bin may be used alone or in combination to provide measurements 115. In addition, one or more TVA methods may be combined with one or more counting methods to provide measurements 115 for each respective bin. Any other MVD measurement or other information related to vessel characteristics for each bin may be obtained and provided alone or in combination to form measurements 115, as the aspects of the invention are not limited in this respect. Other MVD methods, counts and/or measurements may be determined or computed in a BMVD framework, as the aspects of the invention are not limited in this respect.

BMVD measurements provide richer information than conventional MVD methods. In particular, by providing separate measurements for each bin, the different size vessels may be analyzed separately. Accordingly, shortcomings of conventional MVD resulting from, amongst other things, small vessel bias in conventional vessel counting and large vessel bias in conventional TVA measurements may be addressed by separating the information via binning. As a result, contribution from each vessel size may be separately analyzed and evaluated, which may result in better characterization of an ROI of tissue under inspection.

As discussed herein, MVD measurements taken over time may provide valuable information with respect to the evolution of a region of tissue. For example, temporal MVD measurements of a tumor may provide information indicating whether a tumor is growing or shrinking in size, which may be used to assess the effectiveness of a particular treatment. One or more BMVD measurements evaluated over time provides information about the evolution of the region of tissue with respect to vessels of different sizes. Accordingly, changes in the region of tissue that may have been obscured in conventional MVD methods (e.g., by vessel size bias) may be obtained using BMVD.

It should be appreciated that combining the measurements generated in each bin results in the same measure obtained using conventional MVD. For example, summing all of the vessel counts across the bins results in the same total vessel count that could have been obtained using a conventional MVD counting measure. Similarly, summing the vessel areas across bins results in a total vessel area equal to the vessel area that could have been obtained using conventional TVA. Thus, any analysis that may be performed on information obtained using conventional MVD may be performed on the results obtained by performing BMVD. That is, BMVD incurs no loss in information, but rather results in a richer set of information.

While the bin hierarchy illustrated in FIG. 1 includes five bins, any number of bins assigned any values may be used, as the aspects of the invention are not limited in this respect. It should be appreciated from the foregoing that as few as two bins may result in an improved characterization of an ROI over conventional MVD methods. The more bins that are used, the closer the resulting measurements represent the true distribution of vessels in the region of interest. That is, as the range size of each bin approaches zero, the resulting vessel measurements approach a continuous curve indicating the distribution of the vessels in the tissue region under consideration, the integral of which is equal to the corresponding measurement that could be achieved using conventional MVD methods. Thus, BMVD, amongst other things, differentiates the information obtained using conventional MVD as a function of vessel size.

Applicant has recognized that the spatial distribution of blood vessels in tissue may also contain valuable information about the characteristics of a region of tissue being analyzed. In particular, spatial information with respect to blood vessel distribution may facilitate gaining a better understanding of how a region of tissue (e.g., a tumor) is evolving over time. This spatiotemporal data may then be used to ascertain, for example, how effective a chosen treatment is in eradicating a tumor and/or whether a selected drug is having the intended effect on the anomalous tissue region. Accordingly, spatiotemporal BMVD facilitates both an understanding of what size vessels are changing and where the change is occurring.

Figure 2:
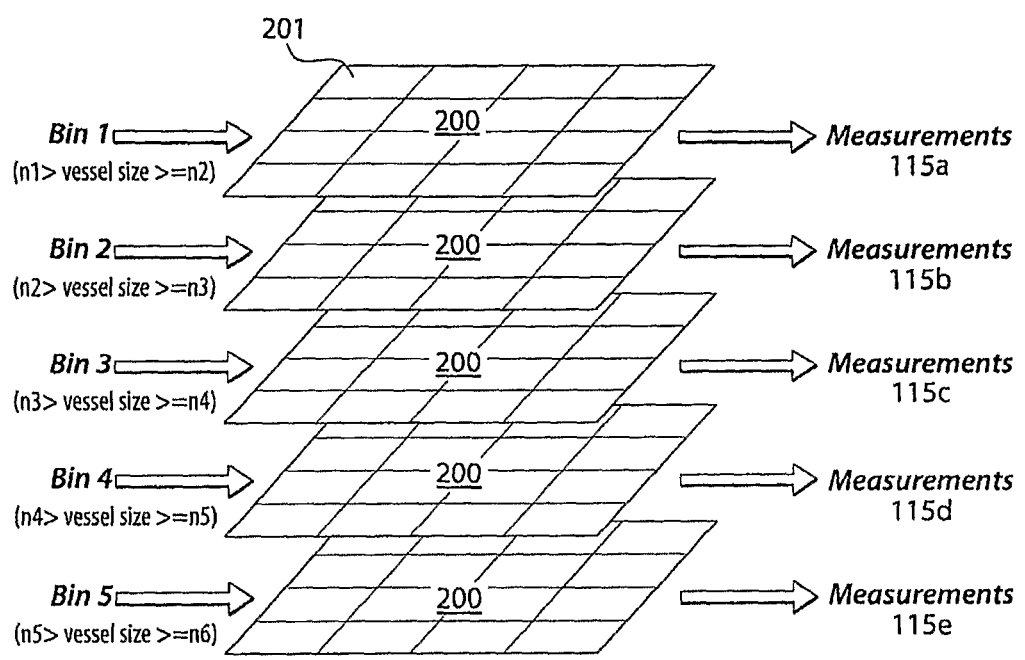
FIG. 2 illustrates a BMVD method incorporating spatial information of vessel distribution, in accordance with some embodiments of the present invention.

FIG. 2 illustrates a BMVD method incorporating spatial information of vessel distribution, in accordance with some embodiments of the present invention. The bin hierarchy illustrated in FIG. 2 may be similar to the hierarchy illustrated in FIG. 1. In particular, cross-section 200 may be analyzed to determine measurements (e.g., vessel count, vessel area ratio, etc.) for vessels in the appropriate size range for each respective bin. However, in the embodiment illustrated in FIG. 2, cross-section 200 (e.g., the region of interest) is divided into a plurality of areas 201. Rather than computing a measurement for each bin, the measurement is determined for each of the plurality of areas 201 for each bin. Accordingly, l measurements are obtained for each bin, where l is the number of areas into which the region of interest is divided. As a result, measurement 115 may be a vector of length l for each bin, wherein each component of the vector represents the measurement taken from the corresponding area 201 of the cross-section.

In some embodiments, the measurement obtained in each region and for each bin is the total number of vessels of the size appropriate for the respective bin that appear in the respective area. In other embodiments, the measurement obtained in each region and for each bin is related to the total vessel area of the vessels of the size corresponding to the respective bin that appear in the respective area. It should be appreciated that any number of different measurements, either alone or in combination, may be obtained for each area in each bin, as the aspects of the invention are not limited in this respect. In addition, different or the same measurements may be taken for each area and/or each bin. For example, volume area measurements may be taken for areas in bin 5 in a central portion of the cross-section to determine the extent of tumor necrosis, but not taken in bin 1 because changes in large vessels may not be as indicative and/or characteristic of early stages of tumor necrosis. However, any measurement obtained in any area of any bin may be performed anywhere in the bin hierarchy, as the aspects of the invention are not limited in this respect.

It should be appreciated that summing over all the regions in a bin results in the same measurements as could be obtained if the cross-section or region of interest had not been spatially divided. That is, summing (or otherwise combining) the measurements obtained by the method described in connection with FIG. 2, results in the same measurement obtained in accordance with method described in FIG. 1. For example, by summing the total number of vessels or total vessel area in each area of a region of interest, the total number of vessels or total vessel area in the region of interest is obtained. Therefore, no information is lost by computing spatiotemporal measurements. As discussed herein, the measurements obtained for each bin may be summed or integrated to arrive at the measurements that could be obtained using conventional MVD methods. Accordingly, the various BMVD techniques differentiate the information provided by conventional MVD methods. As such, all of the information obtained using conventional MVD techniques can be derived from the information obtained using BMVD techniques, but BMVD techniques may provide multiple orders of additional information.

It should be appreciated from the foregoing that a region of interest may be divided into any number of areas. The logical division of cross-section 200 into sixteen areas 201 is merely exemplary and a cross-section may be divided into more or fewer areas, as the aspects of the invention are not limited in this respect. In addition, the cross-section or region of interest need not be divided into a generally regular grid. The region of interest may be segmented into areas of any shape and size, and the individual areas need not be of uniform size or shape, as the aspects of the invention are not limited for use with any particular size, shape or uniformity with respect to dividing an ROI into a plurality of spatial areas. In particular, specific regions of the cross-section may be divided into smaller areas to obtain more granular spatiotemporal information. Also, the cross-section may be segmented and/or labeled before being binned and/or spatially divided.

Applicant has appreciated that there exists a tradeoff between reliability and specificity with respect to choosing the size of the areas by which a region of interest is divided. In particular, with respect to reliability, the larger the area the more resistant the measurements obtained are to statistical fluctuation. In the limiting case, the area becomes the entire region of interest (e.g., as shown in FIG. 1). With respect to specificity, the smaller the area, the more spatial information the measurements contain. Thus, reducing the size of the areas over which BMVD measurements are obtained increases specificity, but decreases reliability. Likewise, increasing the size of the areas over which BMVD measurements are obtained increases reliability, but decreases specificity.

Applicant has recognized that once a critical number of vessels per divided area is reached, the reliability of the measurement tends to saturate. That is, if some minimum number of vessels of the appropriate size appear in an area, obtained measurements are substantially as resistant to statistical fluctuation as the existence of some greater number of vessels of appropriate size in the region. Accordingly, an optimal size area may be one that has the smallest dimensions while still achieving the minimum threshold for reliability.

Figure 3A:
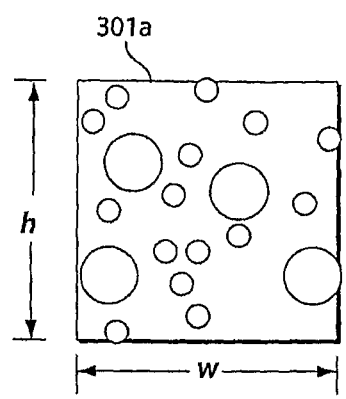
FIGS. 3A and 3B illustrate, schematically, areas of different sizes containing vessel cross-sections of two sizes.
Figure 3B:
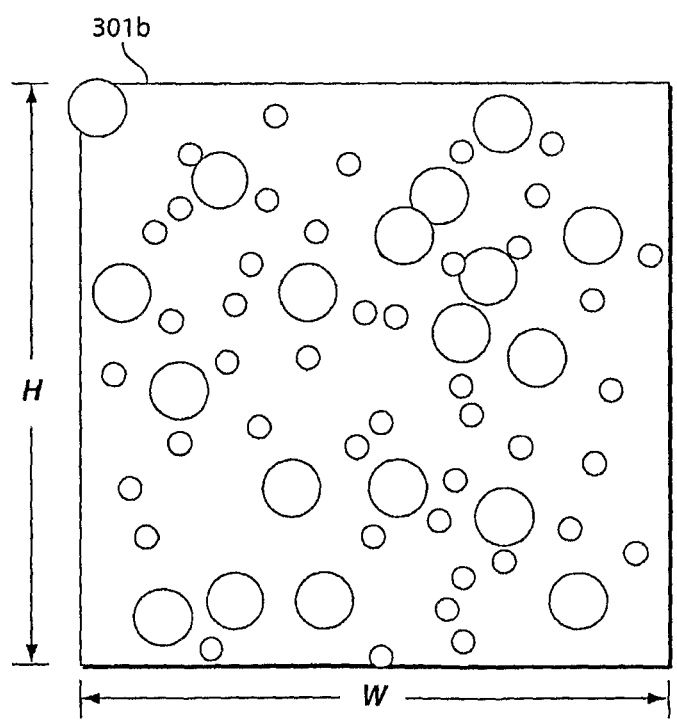

FIGS. 3A and 3B illustrate, schematically, areas of different sizes containing vessel cross-sections of two sizes (denoted by the circles having different radii). In particular, area 301a in FIG. 3A has a width w and a height h and area 301b in FIG. 3B has a width W and a height H. As discussed herein, there is some minimum number of vessels which are needed for measurements to be sufficiently resistant to statistical fluctuations. As shown, only four of the larger blood vessels appear in area 301a. This number may not be sufficient to guard against statistical fluctuation, rendering measurements obtained from this area with respect to the larger blood vessel generally unreliable. However, area 301a contains significantly more of the smaller blood vessels, perhaps enough to make measurements obtained with respect to the smaller blood vessels reliable. Thus, an area size inappropriate for larger vessels due to unreliability, may be appropriate for smaller vessels. Accordingly, the optimal area size over which vessels are analyzed is at least partially dependent on the size of the blood vessel being considered.

Applicant has appreciated that a balance between reliability and specificity may be achieved by varying the size of the area by which a region of interest is divided according to the size of the vessels being considered. In one embodiment, for each bin, the region of interest is divided using areas having dimensions that are determined according to the vessel sizes being considered in the respective bin. In general, the area sizes chosen for each bin decrease as a function of decreasing vessel sizes being considered. However, this is not a limitation on the aspects of the invention.

Figure 4:
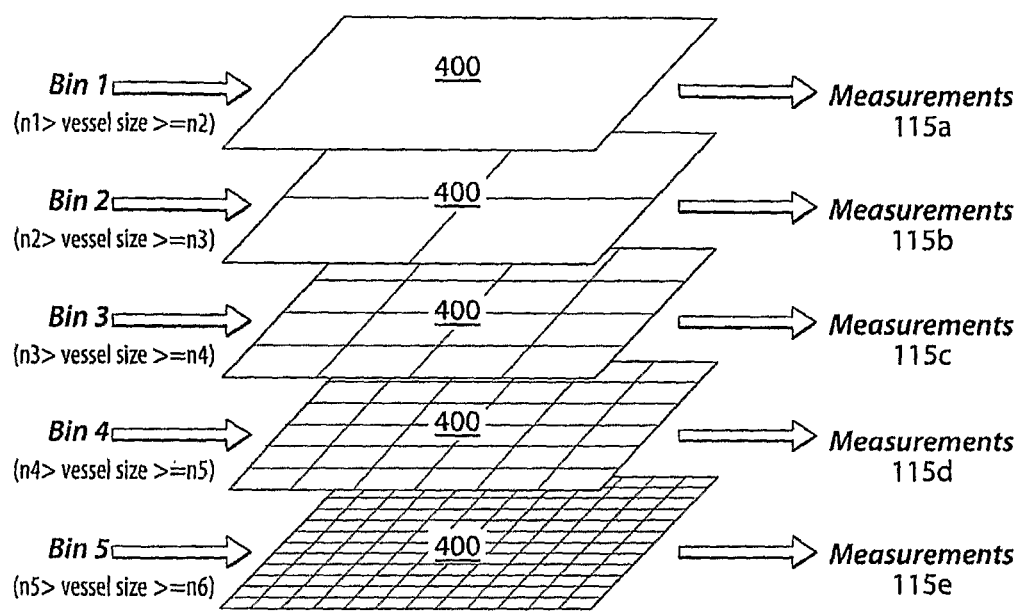
FIG. 4 illustrates a BMVD method using variable size areas to derive spatiotemporal vessel information, in accordance with some embodiments of the present invention.

FIG. 4 illustrates a BMVD method using variable size areas to derive spatiotemporal vessel information, in accordance with some embodiments of the present invention. Cross-section 400 is divided into grid areas whose size depends on the bin being analyzed. In particular, in bin 1, the largest vessels are being analyzed, so the largest grid area is used. Accordingly, an area size may be chosen to ensure that the reliability threshold is met for the largest vessels. Similarly, in bin 5, the smallest vessels are analyzed using the smallest grid area. The area size may be reduced for smaller vessels to achieve greater specificity due to greater likelihood that the reliability threshold will be met in small areas by smaller vessels. As shown in FIG. 4, the cross-section or region of interest 400 is divided into areas that are decreased in size as a function of the size of the vessels being considered in the corresponding bin. By varying the size of the area in which vessels are analyzed, a more optimal balance may be achieved between the generally competing interests of reliability and specificity.

The size of the area used for each bin may be determined in any number of ways. For example, the size of the area may be computed as a function of the radius or diameter of the vessels in the range associated with the bin. Alternatively, the area size may be computed empirically or determined using a probabilistic framework to estimate an optimal or desired area size. In some embodiments, the area size is computed as a constant multiple a of the higher end of the range associated with each bin. Alternatively, α may be a multiplier associated with the lower end of the range, the median or mean of the range, etc. However, any method of determining a varying area size that depends, at least in part, on the size of the vessels being analyzed may be used, as the aspects of the invention are not limited in this respect. In some embodiments, the blood vessel density (e.g., the expected normal blood vessel density) in a chosen ROI may be considered when determining or computing the area size.

It should be appreciated that the grid areas shown in FIG. 4 are schematic and were chosen merely to illustrate the concept of varying the area size according to the size of the vessels being analyzed in each bin. However, the areas may be selected to be of any size and need not be different for each bin. In addition, the areas may be of any shape and need not be regular or uniformly distributed across the region of interest, as the aspects of the invention are not limited for use with any particular area size, shape, configuration and/or distribution.

Figure 5:
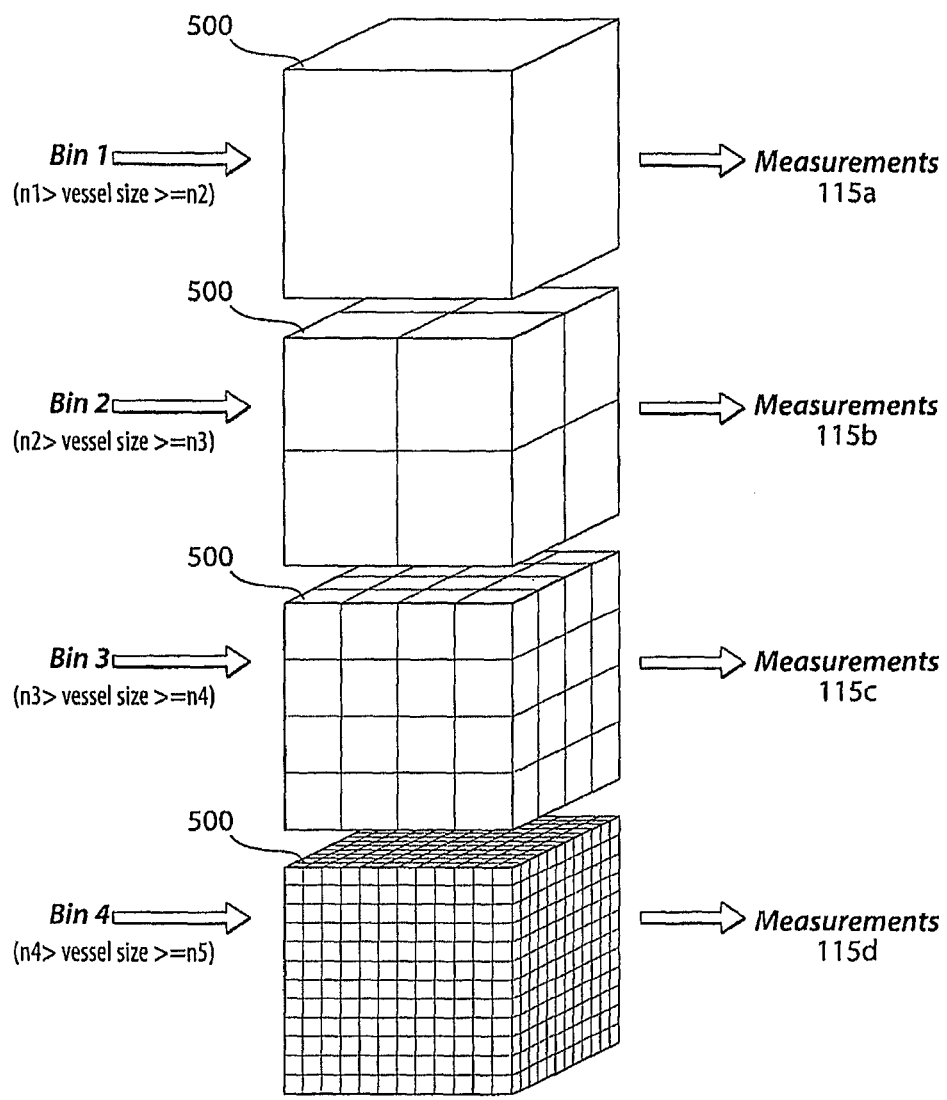
FIG. 5 illustrates the use of BMVD methods on 3D images, in accordance with some embodiments of the present invention.

For simplicity and clarity, FIGS. 1-4 were described in connection with 2D cross-sections of a tissue sample (e.g., a 2D image, or 2D slice of tissue). However, it should be appreciated that the aspects of the invention may be used with three-dimensional (3D) volumes of a tissue sample as well. In particular, as illustrated in FIG. 5, the tissue sample may be a 3D sample of tissue, for example, a 3D image of the tissue formed by performing computed tomography (CT) on the tissue in three dimensions. Accordingly, measurements extracted from volume of interest 500 may be obtained in view of a volume rather than a two-dimensional area or region. Likewise, the areas by which volume 500 is divided will be volumes, such that vessel counts, vessel volume computations, etc., will be performed over a 3D volume, rather than a 2D area. Any of the methods described herein may be performed in 3D, and in some cases, are specifically adapted for use in 3D. For example, any of the BMVD methods described herein may be performed on 3D images of the region of interest.

The term "area" refers herein generically to both 2D and 3D regions of space. In particular, the term "area" refers to a two-dimensional area in 2D and a three-dimensional volume in 3D. Similarly, the term "region" applies generically to 2D and 3D areas of space. Unless otherwise specified, the terms region and area are interchangeable and are used to described both 2D and 3D space. No inference should be made about dimensionality as a result of using one or the other above terms.

Alternatively or in addition to images, any of the herein described BMVD techniques may be performed on casts made of vascular structures. For example, a tissue or organ of an animal may be perfused with a composition comprising a casting agent to stabilize one or more vascular structures in the tissue or organ. Subsequently, the vascular structure(s) may analyzed (e.g., by analyzing the structure of the cast) using one or more BMVD techniques. For example, an appropriate bin hierarchy may be defined according to vessel size for the resulting cast structure (e.g., radius, diameter, etc.) and the number of vessels in each bin counted, and/or a ratio of vessel area to non-vessel area computed for each bin. In addition, casts may be divided into spatial areas to obtain location information about the vessel composition and/or structure. The size of the spatial areas may be a function of the vessel size in each bin to provide a more optimal balance between specificity and reliability. It should be appreciated that any BMVD technique may be used on a cast of a vascular structure, as the aspects of the invention are not limited in this respect.

The casting agent perfused into the tissue/organ to generate that cast may be any suitable material such as any of various polymer materials. For example, casting agents may include, but are not limited to, Microfil®, methyl methacrylate, pre-polymerized methyl methacrylate (Mercox™), Mercox™ CL-2B, silicon, gold nanoparticles, Batson No. 17, etc., or combinations of two or more thereof. As discussed herein, the casting agent(s) may be used to preserve in vivo structures for detailed analysis. In some embodiments, this analysis identifies particular structural or distribution properties that can be subsequently used as markers for in vivo diagnostic, therapeutic, research, and/or other applications in live animals (including humans), for example, by applying one or more BMVD techniques to the resulting cast. In some embodiments, an BMVD analysis may be performed on a cast of the vascularization associated with a disease model. A disease model may be a tumor model (e.g., an ectopic or an orthotopic tumor model) in an animal (e.g., a mouse). However, any other suitable disease model may be used. In some embodiments, an analysis may involve monitoring vascular changes associated with disease progression, response to treatment, or other factors.

It should be appreciated that images on which BMVD are performed may include images of casts obtained by any of the methods described herein. For example, 2D or 3D images acquired of obtained casts may be processed according to one or more BMVD methods described herein. In addition, any one or combination of BMVD techniques described herein may be performed on reconstructed models of tubular structures (e.g., vessel structures). For example, models (e.g., mathematical, geometrical or other descriptions of tubular structure) may be obtained via analysis of image data, raw view data, etc. Such computed models may then be further processed by performing any one or combination of BMVD techniques described herein on the reconstructed model(s).

As discussed herein, determining vessel counts or vessel areas are typically performed by having a skilled operator or technician such as a physician or other specialist trained in the discipline view the tissue sample (e.g., using a confocal microscope or viewing an X-ray image of the tissue) and manually perform the desired computations. However, this procedure is extremely time consuming and requires the presence (and resources) of a skilled operator. Moreover, manual analysis is vulnerable to operator error and operator fatigue. Applicant has appreciated that tissue sample analysis may be expedited by automating at least some of the tasks involved in the analysis. Accordingly, Applicant has developed various computer implemented algorithms adapted to automatically perform one or more measurements on a tissue sample, such as an image of a tissue region of interest.

In some embodiments, an image of a tissue region containing at least some vasculature is segmented into vessel and non-vessel regions. The vessel regions are then analyzed to determine at least one size property of the vessels. The segmented image labeled with the determined property (e.g., vessel size) may then be used to automatically perform one or more BMVD measurements on the image. For example, the labeled image may be used to count the number of vessels in a particular size range associated with one or more bins. Similarly, the labeled image may be used to obtain vessel area measurements associated with one or more bins. The herein described embodiment may be performed by one or more processors executing instructions adapted to automatically segment, label and/or perform one or more BMVD operations or measurements, so that one or more of the tasks need not be performed manually by a human operator, such as a physician.

Figure 6A:
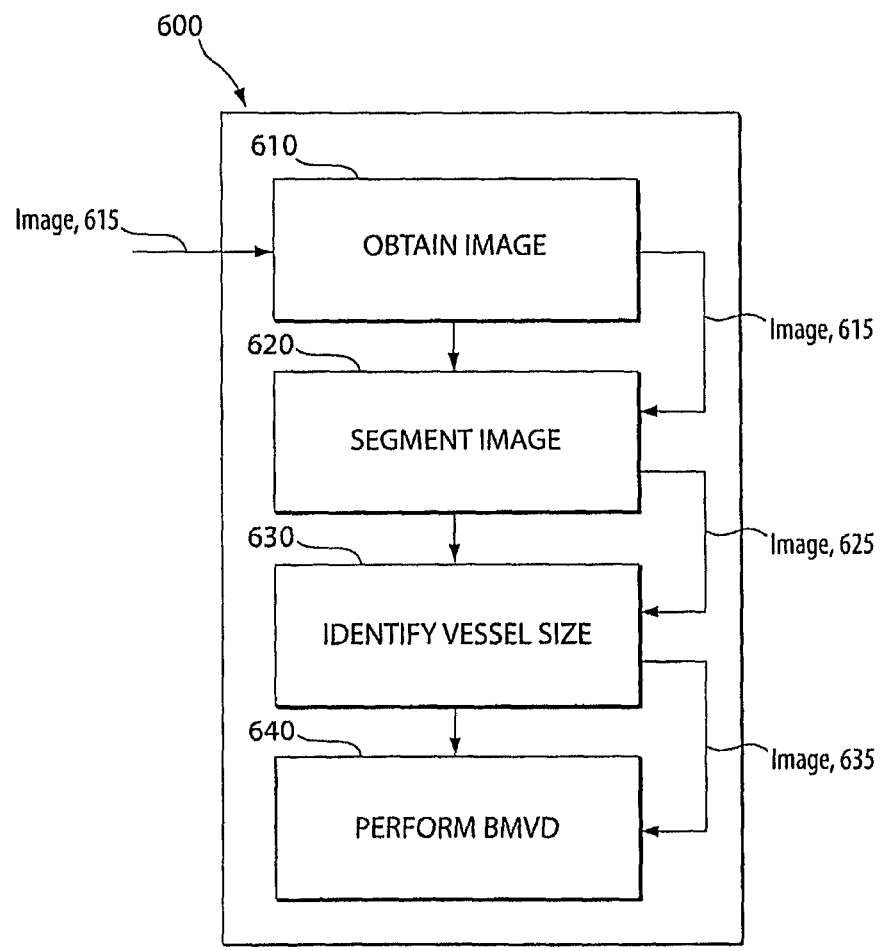
FIG. 6A illustrates one method of automatically performing BMVD, in accordance with some embodiments of the present invention.

FIG. 6A illustrates one method of automatically performing BMVD, in accordance with some embodiments of the present invention. Method 600 facilitates segmenting and determining vessel size information without requiring any substantial intervention from an operator. In particular, method 600 is configured to be computer implemented, obviating the need for a trained specialist to identify vessel regions and categorize them by size according to a desired binning hierarchy. For example, method 600 may be encoded as a computer program having instructions that, when executed on one or more processors, performs one or more automatic BMVD measurements.

In act 610, an image 615 for which one or more automatic BMVD measurements are to be determined is obtained. The image may be a 2D or 3D image of a tissue sample being considered. For example, the image may be a 2D or 3D image of a portion of a human patient containing a tumor that is being treated, or an image of some other biological anomaly being diagnosed, treated or otherwise analyzed. The image may have been acquired from any of various imaging techniques and/or modalities. For example, the image may have resulted from obtaining an in vivo CT scan of the patient. Alternatively, the image may have resulted from magnetic resonance imaging (MRI), positron emission tomography (PET), single photon emission computerized tomography (SPECT), an image obtained from confocal microscopy, etc. The image, for example, may be one image of a series of images acquired or to be acquired over a period of time to evaluate the evolution of a tissue anomaly such as a tumor.

In act 620, image 615 is segmented into vessel areas and non-vessel areas. For example, pixels or voxels in the image may be labeled as either being part of a vessel or part of a non-vessel (e.g., as part of the surrounding tissue). The pixel or voxel may be binary labeled such that vessel pixels/voxels are turned white and non-vessel pixels/voxels are turned black (or vice-versa). However, pixels/voxels corresponding to vessels and non-vessels can be distinguished in any suitable manner. There are numerous segmentation methods that may be suitable for segmenting the image into vessel and non-vessel regions, and the aspects of the invention are not limited for use with any particular segmentation scheme. For example, the image may be segmented using any of various region growing and/or thresholding techniques, any of various level set or fast marching methods, or any other suitable segmentation algorithm.

In some embodiments, segmentation is performed by first identifying regions likely to contain vessels and regions not likely to contain vessels based on one or more characteristics of the image, and second, performing a level set segmentation method using the regions established in the first step as initial conditions, as discussed in further detail below in connection with FIG. 6B. The result of the level set segmentation includes an image wherein pixels or voxels of at least a region of interest in the image is labeled or otherwise indicated as having resulted from vessel material or as resulting from non-vessel material. However, any segmentation method may be used, as the aspects of the invention are not limited in this respect.

In act 630, a segmented image 625 computed in act 620 is further analyzed to ascertain at least one size property of the identified vessel material. For example, the segmented image may be analyzed to determine the vessel radius or diameter of the subject matter identified as vessel material. By determining one or more size properties of the identified vessel material, one or more BMVD measurements may be computed from the obtained size properties. For example, vessel area and/or vessel count information may be automatically computed from an appropriately segmented and labeled image.

In some embodiments, radius-labeling is used to label, with the appropriate radius, pixels or voxels segmented as vessel material for at least a region of interest of the image. For example, a distance transform algorithm may be used to label each pixel or voxel with it's distance from the nearest boundary point (i.e., the nearest non-vessel point). All pixels/voxels sharing the same closest boundary point may then be labeled with the distance of the maximum distance pixel/voxel from the shared boundary point, which approximates the radius of the vessel. One embodiment of a radius-labeling method is described in further detail below in connection with FIG. 6C. Other methods may be used alone or in combination with distance transform methods to convert the segmented image into a radius-labeled image, as the aspects of the invention are not limited in this respect.

In act 640, the segmented and labeled image 635 computed in act 630 is analyzed to compute at least one BMVD measurement. For example, a radius-labeled image may be binned using a plurality of bins, each bin associated with a desired range of vessel sizes. Since each voxel is labeled with the radius of the vessel to which it belongs, the radius-labeled image can be analyzed using the vessels in the appropriate range for each bin. In some embodiments, the total vessel area of vessels in each bin are computed, for example, by automatically counting each voxel labeled with a radius that is within the range of the respective bin. The resulting vessel areas for each bin may then be compared to the total non-vessel area (e.g., by automatically counting the voxels labeled as non-vessel) to obtain a TVA measurement for each bin.

It should be appreciated that image 635 may be divided into a plurality of areas to obtain spatial information with respect to the distribution of the vessels in each bin. For example, the image may be divided as shown in FIG. 2 to encode spatial information into the TVA measurement. In addition, the image may be divided into areas wherein the area size is varied with respect to the size of the vessels in each respective bin, as shown in FIG. 4. Accordingly, the obtained TVA measurement may be optimized with respect to reliability and specificity.

In another embodiment, the radius-labeled image may be further processed to group together pixels/voxels into regions belonging to the same vessel. In this manner, various vessel counting BMVD measurements may be made. For example, a connected-component analysis may be used to group together adjacent pixels having the same radius. Techniques such as region growing may be used to further segment the radius-labeled pixels/voxels into separate vessel regions. In this way, the number of vessels in the image can be identified. Moreover, since each segmented vessel is also labeled with it's radius, one or more BMVD vessel count measurements may be obtained from the image.

Figure 6B:
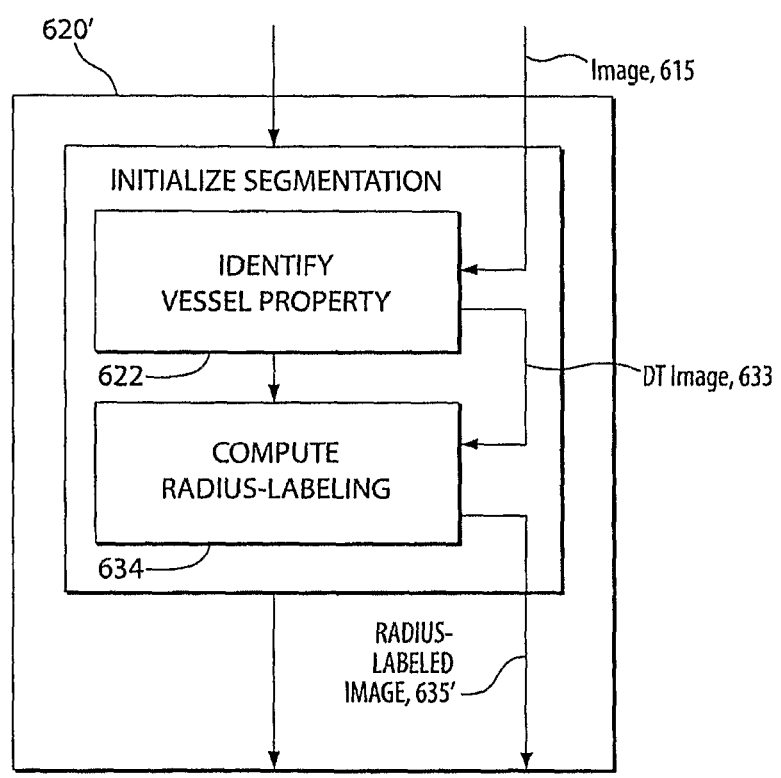
FIG. 6B illustrates a method of segmenting an image containing at least some vascular subject matter into vessel and non-vessel regions, in accordance with some embodiments of the present invention.

FIG. 6B illustrates a method of segmenting an image containing at least some vascular subject matter into vessel and non-vessel regions, in accordance with some embodiments of the present invention. In particular, method 620' is an embodiment of a segmentation method that may be performed for act 620 in method 600 illustrated in FIG. 6A. Method 620' includes a level set method to segment an image 615 into vessel and non-vessel regions. Method 620' may be performed on any type of image of any dimension. Although the segmentation method is described in connection with a 2D image, the segmentation algorithm was designed to be performed on 3D images as well as 2D images, and the aspects of the invention are not limited for use with images of any particular dimensionality.

In act 622, the level set method is initialized by first identifying at least one property or feature in the image that is characteristic of vessel structure. A feature may include one or more detectable properties that facilitate the detection of the feature by any of various image processing techniques. In one embodiment, a feature may be detected by identifying particular relationships between multiple pixel intensities in the image that are characteristic of vessel structure. For example, detecting a feature may include; but is not limited to, identifying a characteristic grey scale pattern, locating one or more derivative properties such as detectable edge characteristics, or locating one or more other higher order derivative properties such as ridges. By identifying a characteristic feature of a vessel, pixels or voxels belonging to vessel material may be identified and used to initialize the level set segmentation algorithm.

Figure 7A:
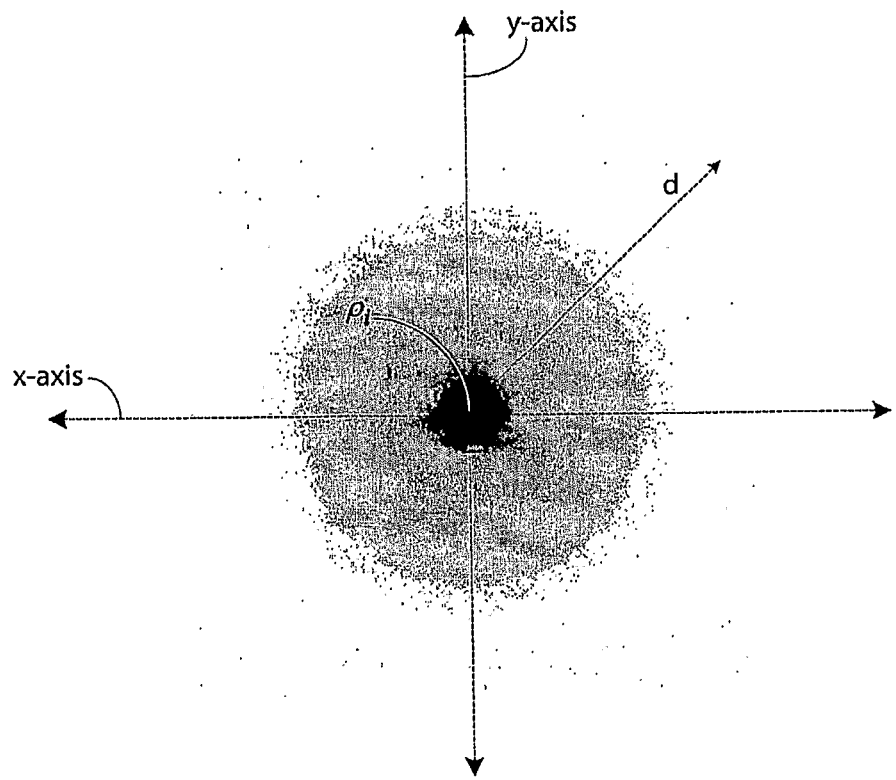
FIG. 7A illustrates a grey scale representation of a characteristic function of a model used to detect vessel structures, in accordance with some embodiments of the present invention.
Figure 7B:
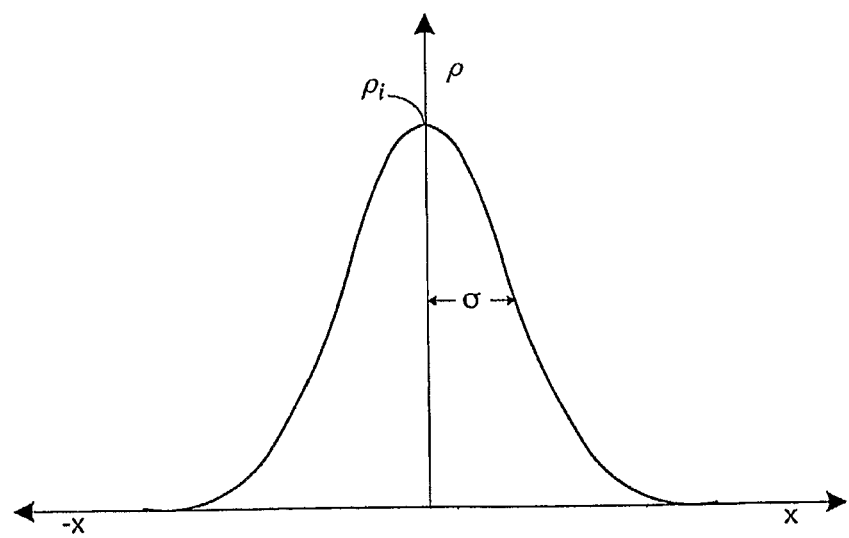
FIG. 7B illustrates a plot of the intensity values along the x-axis at the center of the grey scale Gaussian distribution in FIG. 7A.

Applicant has appreciated that the cross-section of a vessel may be characterized by a generally Gaussian shaped intensity distribution. The cross-sectional density of a vessel may be modeled by a Gaussian distribution, centered on the longitudinal axis of the vessel, so that the modeled density is the highest at the center of the vessel. For example, the cross-sectional density distribution of a cylindrical vessel segment, when oriented such that its longitudinal axis coincides with the z-axis, may be modeled as, $$\rho \left( e^{-\frac{1}{r^2}((x-x_1)^2 + (y-y_1)^2)} \right) \tag{1}$$

where $\rho$ is the density coefficient at a center of the cylindrical segment and r is the radius of the cylindrical segment, so that the density is modeled as being greatest at the center (i.e., equal to $\rho$) and decays exponentially as a function of radial distance from the center. FIG. 7A illustrates a grey scale representation of the function given in equation 1, where darker grey scale values indicate increased density values. FIG. 7B illustrates a plot of the intensity values along the x-axis at the center of the grey scale Gaussian distribution in FIG. 7A.

Figure 8:
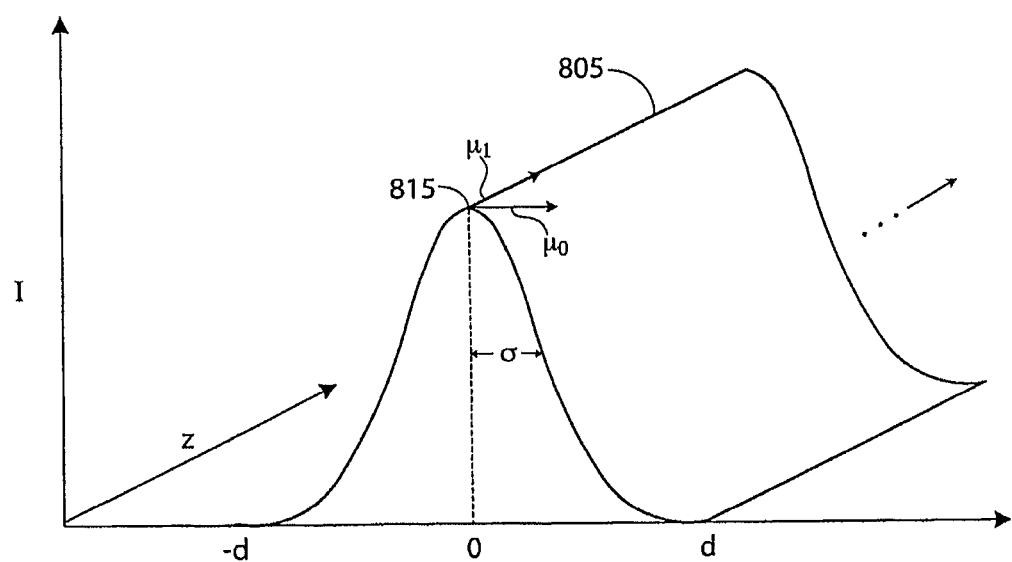
FIG. 8 illustrates schematically a cylindrical vessel segment intensity distribution model, in accordance with some embodiments of the present invention.

The density distribution along the longitudinal axis of the cylinder (i.e., into and out of the page in FIG. 7A) is substantially uniform and does not vary substantially and may be modeled as a constant function of the cross-sectional distribution along the longitudinal axis, that is, as a constant function of the radial distance d from the center of the distribution. FIG. 8 illustrates schematically a cylindrical vessel segment intensity distribution model. In particular, the model of the cylindrical vessel segment has a maximum density at the center that decays exponentially to the boundary of the vessel as a function of the radial distance d, from the center. At each distance d, the density is uniform along the z-axis. For example, the density at d=0 is the density maximum along the length of the vessel. This density maximum shown by line 805 is referred to as a ridge.

If the herein described characteristic intensity distribution or similar distribution can be identified in the image, the associated pixels/voxels are likely to belong to a vessel. The characteristic points may be used to facilitate segmenting the image into vessel and non-vessel regions. One method of detecting the characteristic shape illustrated in FIG. 8 is to perform ridge detection on the image (e.g., image 615). However, other methods may be used to detect the characteristic shape defined by the model, as the aspects of the invention are not limited in this respect.

A ridge point is defined herein as a point in an image wherein the intensity assumes a local extrema in the direction of principal curvature, i.e., the direction having the steepest intensity gradient. For example, at point 815 (and along ridge 805) in FIG. 8, the principal direction of curvature is shown by $u_0$ (i.e., the unit vector $(1,0)$ in the (d, z) coordinate frame). Each point along ridge 805 forms a ridge point since each point is a local maximum along the z-axis. Accordingly, a ridge may be characterized by local derivative information in the image and may be detected by examining the curvature of intensity about points of interest in the image. In one embodiment, a Hessian operator is used to extract curvature information from the image to faciliate the detection of ridge points. In general terms, the purpose of applying the Hessian operator is to gather information concerning the way in which the intensity values vary in the pixels surrounding a pixel of interest. As discussed below, this information may be used to identify areas characteristic of a ridge. The Hessian operator in 2D may be expressed as, $$H = \begin{bmatrix} \frac{\partial^2 g}{\partial x^2} & \frac{\partial^2 g}{\partial x \partial y} \\ \frac{\partial^2 g}{\partial x \partial y} & \frac{\partial^2 g}{\partial y^2} \end{bmatrix} \tag{2}$$

where g is the image operated on by the Hessian, and x and y are the coordinate axes of the image. For example, the Hessian operator may be applied to an image by computing the Hessian matrix at each pixel or each of a subset of pixels in the image, referred to as target pixels. The partial derivative elements of the Hessian matrix may be computed at each target pixel in a variety of ways. For example, the Hessian matrix may be determined by computing appropriate differences in a pixel neighborhood of the target pixel (e.g., an eight pixel adjacency neighborhood of the target pixel). Using a 3×3 neighborhood the Hessian matrix elements may be computed by weighting the pixel, intensities according to corresponding elements of a discrete derivative mask and then summing the result. Exemplary derivative masks for the partial derivative elements of the Hessian are:

$$\frac{\partial^2 g}{\partial x^2} = \frac{1}{3} \begin{bmatrix} 1 & -2 & 1 \\ 1 & -2 & 1 \\ 1 & -2 & 1 \end{bmatrix}, \tag{3}$$

$$\frac{\partial^2 g}{\partial y^2} = \frac{1}{3} \begin{bmatrix} 1 & 1 & 1 \\ -2 & -2 & -2 \\ 1 & 1 & 1 \end{bmatrix},$$

and

-continued $$\frac{\partial^2 g}{\partial x \partial y} = \frac{1}{4} \begin{bmatrix} 1 & 0 & -1 \\ 0 & 0 & 0 \\ -1 & 0 & 1 \end{bmatrix}.$$

The center of each matrix corresponds to the target pixel and the intensity of each of the eight adjacent pixels to the target pixel are multiplied by the corresponding element of the mask and summed together. The sum from each mask determines the corresponding element in the Hessian. It should be appreciated that other sized-neighborhoods and different interpolating functions (i.e., the mask weights) for the pixels within the neighborhoods may be used, as the aspects of the invention relating to computing discrete partial derivatives are not limited to any particular method or implementation.

As discussed herein, the Hessian describes the local curvature of intensity at pixels in the image. The principal direction of curvature may be determined by decomposing the Hessian into its characteristic components. One method of determining the characteristic components of a matrix is to determine the eigenvalues and associated eigenvectors of the matrix.

In general terms, the eigenvectors of the Hessian matrix indicate the characteristic directions of curvature at a target pixel at which the Hessian was determined. As discussed below, the relationship between these characteristic directions of curvature may be employed to identify areas in the image having characteristics of a ridge. The eigenvalues and associated eigenvectors of a matrix may be determined in various ways, for example, by any number of well known iterative method of diagonalizing a matrix or analytically by directly solving the relationship:

$$Hu = \lambda u \quad (4)$$

where H is the Hessian matrix of equation 2, u is an eigenvector of matrix H, and $\lambda$ is an eigenvalue associated with u. The magnitude of each eigenvalue of the Hessian is related to the "significance" of the associated eigenvector. Stated differently, the eigenvalue indicates how much the curvature along the associated eigenvector contributes to the local curvature determined by the Hessian. Accordingly, the largest eigenvalue of the Hessian matrix is associated with the principal direction of curvature.

As is well known, the 2D Hessian is a 2×2 symmetric matrix and therefore has two eigenvalues, $\lambda_0$ and $\lambda_1$, associated with respective and linearly independent eigenvectors $u_0$ and to $u_1$ (i.e., eigenvectors $u_0$ and $u_1$ are orthogonal). The eigenvalue $\lambda_0$ herein denotes the eigenvalue having the greatest absolute value and is referred to as the principal eigenvalue. Accordingly, the associated eigenvector $u_0$ indicates the principal direction of curvature at a target pixel and $\lambda_0$ is related to the magnitude of the curvature. The eigenvalue $\lambda_1$ (referred to as the secondary eigenvalue) is related to the magnitude of curvature in the direction of $u_1$, i.e., in a direction orthogonal to the principal direction of curvature indicated by $u_0$.

At a ridge, the curvature in a direction along the profile may be expected to be relatively large, while the curvature in an orthogonal direction along the ridge may be expected to be relatively small. Therefore, a ridge point may produce a large principal eigenvalue and a small secondary eigenvalue. For example, expected eigenvectors $u_0$ and $u_1$ are labeled at ridge point 815 in FIG. 8. Since the curvature in the direction of $u_0$ is large, the magnitude of $\lambda_0$ is expected to be large as well. Likewise, since the intensity distribution is expected to be substantially uniform along the sinusoidal trace, the curvature in the direction of $u_1$ is theoretically zero and the magnitude of $\lambda_1$ is expected to be substantially zero. The values of and relationship between $\lambda_0$ and $\lambda_1$ may be employed to determine whether each target pixel at which the Hessian is computed is characteristic of a ridge point. That is, ridge points may have local curvature features expressed by the values of and/or the relationship between $\lambda_0$ and $\lambda_1$ that may be detected by evaluating the eigenvalues.

In one embodiment, a target pixel may be identified as a possible ridge point based on a predetermined criteria for the eigenvalues of the Hessian at the target pixel. For example, a threshold value may be applied to the magnitude of $\lambda_0$ to select as possible ridge points only target pixels having a principal eigenvalue that exceeds the threshold value. In addition or alternatively, a ratio of the magnitude of $\lambda_0$ the magnitude of $\lambda_1$ may be subject to a threshold value such that ratios exceeding the threshold value are considered to have come from ridge points in the image.

The sign of $\lambda_0$ may also be used to exclude ridges characterized by the wrong extrema (i.e., local minimum versus local maximum). These so-called valleys are not characteristic of vessels and may be eliminated from consideration. For example, when the grey level scheme of the image represents higher ray attenuation by lighter pixels (higher grey level values) as in FIG. 8, points giving rising to a negative $\lambda_0$ may be ignored (i.e., they indicate troughs rather than crests). Similarly, when the grey level scheme represents higher ray attenuation by lower grey level values, points giving rising to positive $\lambda_0$ may be ignored. Other criteria for evaluating eigenvalues and/or eigenvectors may be used, as aspects of the invention are not limited in this respect.

Accordingly, ridge detection may be applied to an image to select ridge points by evaluating the local curvature characteristics about target points in the image. It should be appreciated that the above technique for locating ridge points is described merely as an example. Any other method suitable for discriminating ridge points from non-ridge points may be used, as aspects of the invention are not limited in this respect. It should be further appreciated that any feature characteristic of vessel structure may be detected and used to initialize the level set segmentation method, as the invention is not limited to ridges or any other particular property and/or characteristic.

As discussed herein, a region of interest in the image may contain vasculature having a variety of vessels of differing sizes. The different size vessels will give rise to Gaussian profiles at different scales. In particular, the σ of the Gaussian profile (see FIG. 7) will change as a function of the vessel size. As a result, ridge detection at one scale (i.e., detection of vessels of a certain size) may be ineffective at detecting vessels at a different scale. To avoid missing vessels, ridge detection may be performed at a desired number of scales to identify likely points belonging to vessel structure at a number of different sizes. For example, ridge detection may be performed at a scale corresponding to each bin being used in the BMVD computations. More than one scale may be used to detect vessels in a single bin as well. Ridge detection and/or some other type of feature detection may be performed at any scale and at any number of scales, as the aspects of the invention are not limited in this respect.

The ridge points (or other detected feature points) may then be used as indicators that vessel material is present at that point. The characteristics of the ridge may there be used to further identify other points belonging to the vessel structure.

For example, the scale at which the ridge point was detected may be used to estimate the width of the vessel and to identify points within the vessel in the direction of maximum curvature. In addition, the orientation of the ridge (i.e., the direction of least curvature) may be used to track the ridge to identify further points that acre likely to represent vessel material. Other methods may be used to identify further points in the image that represent vessel material, as the aspects of the invention are not limited in this respect.

In act 626, an intensity based method is used to identify points that likely represent vessel material. Using the peak point of the ridges identified in act 624 (which corresponds to the center of the vessel), as a starting point, the intensity profile about the ridge point may be analyzed to determine which points are within the vessel structure and which points are likely outside of it. As discussed herein, vessel structures have a characteristic Gaussian profile. Accordingly, a Gaussian kernel may be used to identify points inside and outside of the vessel structure. In particular, points within a vessel structure are expected to respond more strongly to the Gaussian kernel then points outside of the vessel structure. A probabilistic method (e.g., hypothesis testing) may be used to determine which points are likely to be inside the vessel structure detected from the ridge, and which points are likely to be outside the vessel structure.

In one embodiment, a plurality of Gaussian kernels at the appropriate scale (e.g., as estimated by the scale used to detect the ridge point) are convolved with regions about the ridge point at successively further distances from the ridge point (i.e., at successively further distances from the center of the detected vessel). For example, a Gaussian kernel may be positioned inside the hypothesized vessel structure, inside the hypothesized vessel structure near the assumed boundary, outside the hypothesized vessel structure near the assumed boundary and outside the hypothesized vessel structure. The probabilistic method then determines which points, if any, are inside and which points are outside the vessel based on the similarity between the different regions and the Gaussian profile.

The intensity based approach has at least two beneficial effects. First, the intensity analysis ensures that the region about a detected ridge point also includes an intensity profile characteristic of vessel structures, thus eliminating or reducing the number of false positives (i.e., ridges that arise from structure other than vessels). In addition, the intensity analysis identifies the points about the ridge that are likely to represent vessel structure. Accordingly, acts 624 and 626 identify vessel material that both satisfy ridge criteria and that have an intensity profile characteristic of vessel structures. After the ridge-based and intensity based analyses are performed, the points (i.e., pixels, voxels, etc.) identified as representing vessels are labeled as such. In addition, the identified vessel points may be labeled with any probability (e.g., confidence level) associated with how likely it is that the point represents vessel material.

In act 628, the image is analyzed to identify pixels or voxels that belong to non-vessel material. This, in essence, is the flip side of act 624. Instead of identifying points in the image likely representing vessel material, points in the image likely representing non-vessel material are identified. In one embodiment, the ridge detection results may be used to identify valleys in the image. A valley is simply a ridge wherein the point of maximal curvature is a local density minimum, rather than a local density maximum. As discussed herein, the sign of $\lambda_0$ is indicative of whether the point of maximal curvature is a ridge or a valley. Accordingly, the same ridge detection data may be used to identify valley points, which are assumed to represent non-vessel material. In addition, the intensity based analysis described above in act 626 can be used to identify areas outside the vessel, that is, non-vessel areas. Accordingly, regions identified as vessel and non-vessel material may be used to initialize the level set segmentation method. By identifying and labeling both vessel and non-vessel points, a more accurate and efficient "two-sided" level set segmentation may be performed, as described in further detail below.

While ridge detection and Gaussian profiling are used to detect features characteristic of vessels in the above embodiment, any method may be used to identify vessel material in the image. It should be appreciated that any method may be used to identify points, regions or structures that are likely to be part of vessel material and/or likely to be part of non-vessel material to initialize the level set segmentation method, as the aspects of the invention are not limited in this respect.

In act 626, the regions labeled as vessel material and non-vessel material are used to initialize a level set segmentation algorithm that employs a partial differential equation (PDE) to spread out from the initialization, converging to a fully segmented region. That is, pixels/voxels labeled as vessel material begin to spread out as a function of forces described by the PDE, labeling pixels/voxels that it encounters along the way as representing vessel material. Likewise, pixels/voxels labeled as non-vessel material spread out according to PDE forces, labeling pixels/voxels that it encounters as representing non-vessel material. Accordingly, a two-sided level set segmentation method is performed; spreading out from both labeled vessel and non-vessel pixels/voxels. The level set algorithm may complete when all of the pixels/voxels have been labeled as either representing vessel or non-vessel material.

In one embodiment, the speed at which the regions spread to neighboring pixels depends, at least in part, on the whether the region is in an area of like material. That is, a vessel region will spread faster in areas that look more like vessel areas and slow down in areas that look less like vessel areas. Similarly, non-vessel regions will spread faster in regions more likely to be non-vessel regions then in regions less likely to be non-vessels regions. Alternatively, the vessel and/or non-vessel regions may spread at a uniform velocity (e.g., as in certain fast marching methods), as the aspects of the invention are not limited in this respect. It should be appreciated that other level set segmentation methods will occur to those skilled in the art, and the aspects of the invention are not limited to the two-sided level set segmentation method described above, or to any particular level set or other segmentation method.

In addition, other characteristics may be used to control the expansion of the level set algorithm. For example, edges in the image may be used to slow down and/or halt the expansion of a region. In particular, encountering an edge may be used as an indication that the region is crossing over from vessel material to non-Vessel material (or vice-versa). Accordingly, edge-detection may be performed on the image to label appropriate pixels/voxels as edges. The edges provide contours for the level set algorithm and function as boundaries for the spread of vessel and non-vessel regions. Thus, the edges provide additional forces and/or constraints on the PDE describing the level set expansion.

When the level set segmentation algorithm converges, the image is segmented into vessel and non-vessel pixels/voxels (e.g., is segmented into a binary image). Once image 615 is segmented into segmented image 625, further processing may be performed on the image to determine at least one size characteristic about the vessel pixels/voxels. As discussed herein, one embodiment includes determining the radii of the vessel material identify in act 620. However, other size characteristics that facilitate one or more BMVD operations may be determined, as the aspects of the invention are not limited in this respect.

Figure 6C:
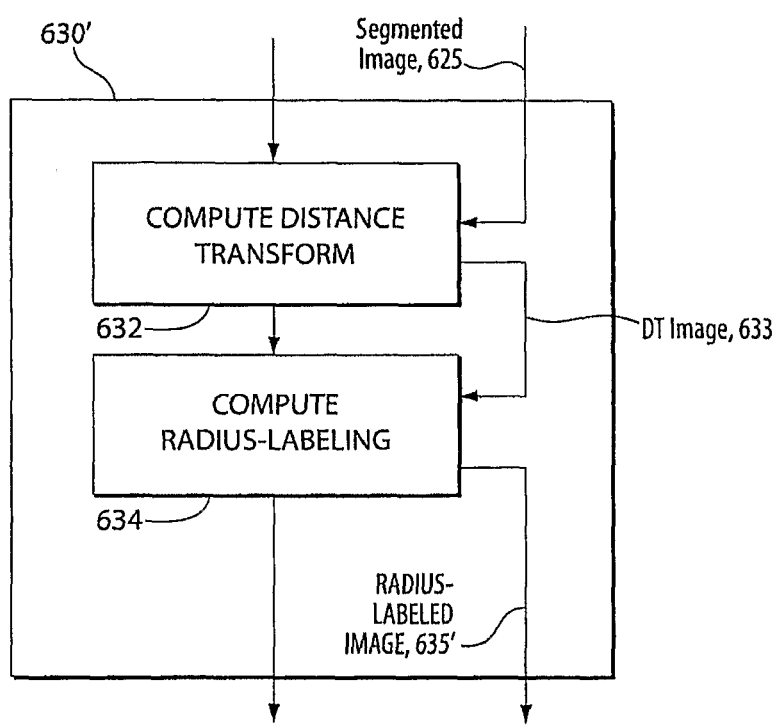
FIG. 6C illustrates a method of radius-labeling a segmented image, in accordance with some embodiments of the present invention.

FIG. 6C illustrates a method of radius-labeling a segmented image, in accordance with some embodiments of the present invention. In particular, method 630' is one embodiment of a method that may be performed as act 630 in method 600 illustrated in FIG. 6A. In act 632, a distance transform is computed on a segmented image 625', which may for example have been segmented by performing method 620' described in FIG. 6B. The distance transform may include any method that labels each pixel or voxel with its distance from a reference pixel/voxel. In method 630', the reference pixel/voxel is the nearest non-vessel pixel/voxel, referred to herein as a boundary point.

Figure 9A:
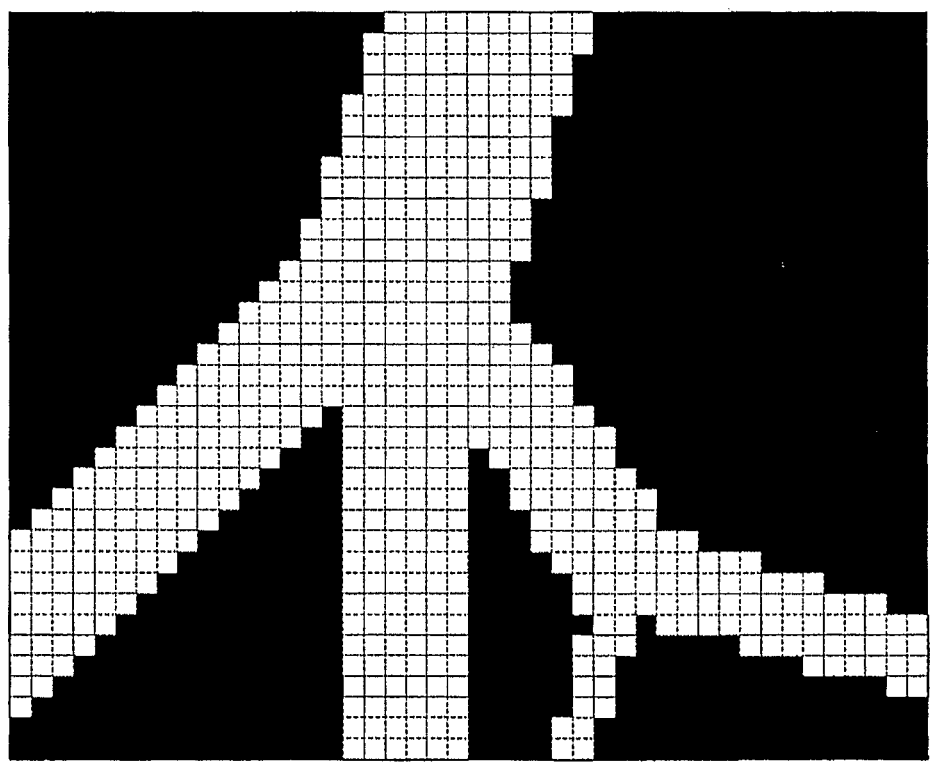
FIG. 9A illustrates a portion of an image segmented into vessel and non-vessel regions, in accordance with some embodiments of the present invention.
Figure 9B:
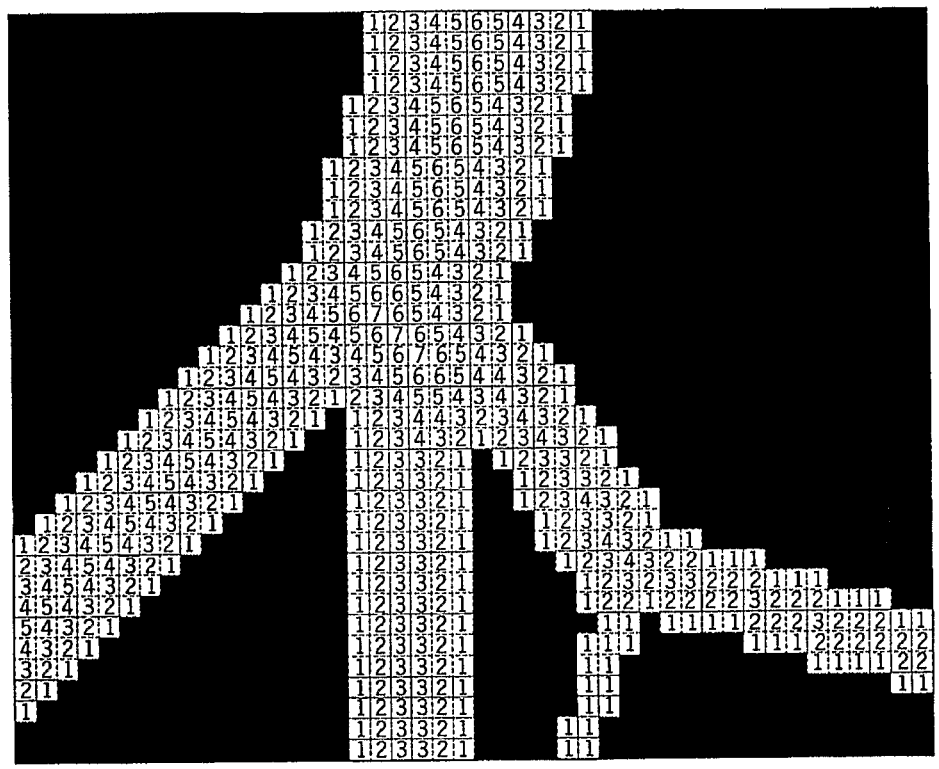
FIG. 9B illustrates a distance transform performed on the segmented image of a vessel structure illustrated in FIG. 9A, in accordance with some embodiments of the present invention.

FIG. 9B illustrates a distance transform performed on the segmented image of a vessel structure illustrated in FIG. 9A. Each pixel has been labeled with the distance at which the pixel is situated from the nearest boundary pixel (i.e., the nearest black pixel). While only the distance is shown labeled at each pixel, it should be appreciated that each pixel may also be labeled with its nearest boundary point. For example, each pixel may be labeled with the x,y coordinate of the one or more closest boundary points. As a result, the nearest boundary point(s) can be referenced from each pixel. For example, the segmented image in FIG. 9A may have resulted from any desired segmentation algorithm that labels pixels as vessel material (e.g., white pixels) and non-vessel material (e.g., black pixels).

The distance transform can be thought of as and computed by, generating a wavefront at the boundary and advancing the wavefront forward and away from the boundary one pixel at a time on each iteration. The distance from the boundary is incremented at each iteration, and each pixel encountered by the wavefront is labeled with the incremented distance. In FIG. 9B, the distance transform is computed using the city block or Manhattan distance for simplicity. That is, the wavefront moves only in vertical and horizontal directions. Thus, the distance of a pixel $(x_n, y_n)$ from a nearest boundary point $(x_b, y_b)$ in 2D is $/x_n-x_b/+/y_n y_b/$. Likewise, the distance of a voxel $(x_n, y_n, z_n)$ from a nearest boundary point $(x_b, y_b, z_b)$ in 3D is $/x_n-x_b/+/y_n-y_b/+/z_n-z_b/$.

Other distance measures may be used, as the aspects of the invention are not limited in this respect. For example, the Euclidean distance, which computes the distance from the nearest boundary point as, $$D_{euc} = \sqrt{(x_n-x_b)^2+(y_n-y_b)^2} \text{ in 2D} \quad (5),$$

and $$D_{euc} = \sqrt{(x_n-x_b)^2+(y_n-y_b)^2+(z_n-z_b)^2} \text{ in 3D} \quad (6),$$

may be used to compute distances in a distance transform. Alternatively, the chessboard distance may be used. Using the chessboard distance, vertical, horizontal and diagonal movements are all considered equivalent from a distance perspective. That is, the chessboard distance computes the distance from the nearest boundary point as, $$D_{chess} = \max(/x_n-x_b/,/y_n-y_b/) \text{ in 2D} \quad (7),$$

and $$D_{chess} = \max(/x_n-x_b/,/y_n-y_b/,/z_n-z_b/) \text{ in 3D} \quad (8).$$

Other distance measures may be used as well, as the aspects of the invention are not limited in this respect. For example, more sophisticated methods may be used to compute the distance transform. For example, distances may be computed at the sub-pixel level to avoid many of the discretization errors encountered using the granularity of pixel boundaries. In addition, the distances may be computed analytically or iteratively by computing the medial axis of the segmented image. Any distance transform method that maps the distance between pixels and/or voxels in the image and the closest boundary point, or the boundary from which the point arises may used, as the aspects of the invention are not limited in this respect.

In act 634, the distance transform image 633 is converted into a radius-labeled image 635'. It should be appreciated that the radius of the schematic vessels illustrated in FIG. 6 correspond to the medial axis of the vessel network. As known in the art, the medial axis of an object is the locus of centers of maximal inscribed (e.g., bi-tangent) circles within an object. That is, the medial axis is the set of points whose distance from the nearest boundary point(s) is greater than or equal to all other points sharing the same nearest boundary point. Accordingly, in the context of the distance transform, the medial axis may be computed by identifying all points that are maximally distant from its nearest boundary point(s) (i.e., each pixel having the longest shortest path back to the boundary). The medial axis points are emphasized in bold in FIG. 9C.

Figure 9C:
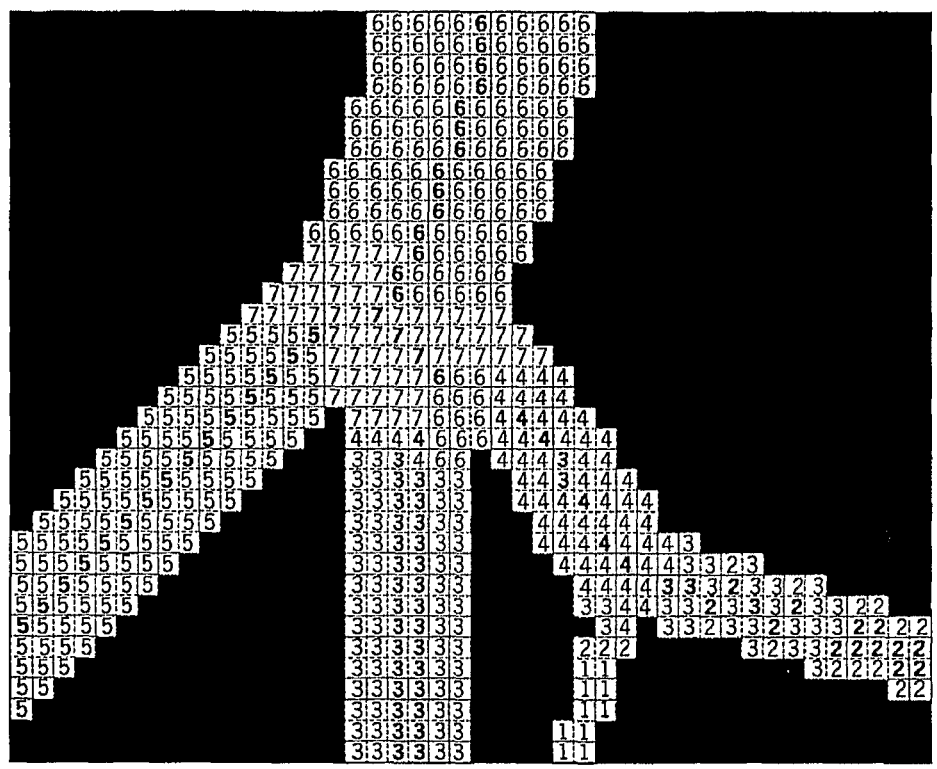
FIG. 9C illustrates a radius-labeled image converted from the distance transform image of FIG. 9B, in accordance with some embodiments of the present invention.

The distance of the medial axis point from the boundary, therefore, may be used to indicate the radius of the object at that point. In addition, each pixel along the path taken by the wavefront to the medial axis point should also be labeled with the radius at the medial axis. Since, the nearest boundary point(s) to each pixel are known and may have been labeled during the distance transform, all points sharing the same boundary point with the medial axis point may be labeled with the distance of the medial axis point. FIG. 9C illustrates a radius-labeled image converted from the distance transform image 633 shown in FIG. 9B. As shown, each pixel is labeled with the radius of the vessel to which it is associated.

Since a Manhattan distance was used to compute the distance transform, their may be multiple maximal shortest paths back to the boundary from a medial axis point. In FIG. 9C, each of the pixels along these paths was labeled with the distance of the corresponding medial axis point. There are numerous ways of maintaining information about nearest boundary points at each pixel, and more particularly, at the medial axis points. For example, bi-directional pointers may be maintained at each pixel/voxel that points to the pixel/voxel from which the wavefront was propagated from. Once the medial axis points have been determined, the pixels/voxels along each path to the medial axis from the boundary point may be backtracked and the pixels/voxels along the path may be labeled with the distance measurement at the medial axis point. It should be appreciated that any suitable algorithm may be used to perform a distance transform and to convert the distance transform to a radius labeled image, as the aspects of the invention are limited in this respect.

FIG. 9C contains information sufficient to perform one or more BMVD measurements. In particular, the vessel size at each pixel has been computed and is therefore known. Moreover, the image has been segmented into vessel and non-vessel points, facilitating a comparison between vessel and non-vessel areas for any desired range of vessel sizes. It should be appreciated that the image may be divided into any number of areas, and/or divided into areas having a size dependent, at least in part, on the size of the vessels being analyzed to obtain spatial information about vessel distribution characteristics, etc. It should be appreciated that the image in FIG. 7d is schematic to clearly illustrate at least some of the inventive concepts that may be performed on real images containing biological vasculature. In addition, methods 620' and 630' were described in connection with 2D images for ease of illustration. However, the various methods described herein are designed to be performed in 3D as well. Accordingly, the various methods described herein are not limited to images of any particular dimensionality.

The methods described herein, and more particularly, the methods described in connection with FIGS. 6 and 7 provide (in addition to extracting more information related to vessel characteristics from binning and/or spatial segmenting) substantial benefits over conventional MVD computations in that the methods may be performed automatically. That is, the methods may be performed by processing the images with a computer implemented program, rather than having the analysis performed by a trained specialist such as a physician. Accordingly, automatic BMVD computations relieve trained physicians of the time consuming and error prone task of manually segmenting and manually performing one or more BMVD measurements on an image of interest.

Applicant has appreciated that BMVD measurements may be used in a number of applications related to diagnosis, prediction and prognosis of biological anomalies such as cancerous tumors. In particular, spatiotemporal information about the vessel distribution provides numerous indicators about the health of a tumor, the effectiveness of a treatment such as the efficacy of a particular anti-angiogenic drug, and how a tumor is changing over time with respect to differently sized vessels. Numerous exemplary applications using one or more BMVD measurements, in accordance with various aspects of the present invention are described herein. Applicant has identified and disclosed various applications that are facilitated by the acquisition of information about vessel characteristics, distribution, size, shape, etc., in PCT application US2005/047081 filed on Dec. 22, 2005, which is hereby incorporated by reference in its entirety. Applicant has appreciated that certain of these applications are facilitated by obtaining one or more BVMD measurements or by using one or more alternative binned analyses. It should be appreciated that any application may involve an analysis limited to one or more (e.g., 2, 3, 4, 5, 6, 7, 8, 9, 10, or more) bins of microvasculature of different sizes. For example, binned analyses may be useful for diagnostic applications. In one embodiment, aspects of the invention can be used to detect and diagnose diseases associated with patterns (e.g., individual structural features or distributions) of in situ tubular networks. In some cases, a diagnosis can be rendered from an examination of the patterns (e.g., individual structural features or distributions) of interest at a single time. Alternatively, disease progression in a subject can be tracked by performing a structural analysis at two or more (e.g., 3, 4, 5, 6, 7, 8, 9, 10, or more) time points. Disease tracking can be used to provide diagnostic and prognostic information for a patient. For example, disease progression information can be used to assess the aggressiveness and/or invasiveness of a tumor.

The invention can be used to screen an individual or a population for the presence of indicia relating to one or more diseases. As mentioned herein, the screen may be a whole body screen, or may be focused on one or more target regions (e.g., specific organs or tissues).

In one embodiment, the techniques described herein can be used automatically to identify individuals with one or more disease-associated structural patterns or features. These individuals can be subsequently tested for additional indicia of disease. The subsequent testing can take any suitable form, as the aspects of the present invention described herein are not limited in this respect. For example, follow on testing can employ conventional techniques. As a non-limiting example, the use of aspects of the present invention may enable cost-effective screening techniques that may identify a relatively small pool of candidates as at risk of a disease, and may justify the use of relatively more expensive testing procedures to reach a final diagnosis or prognosis, wherein the follow on techniques may be too expensive to administer to a wider sample that has not been narrowed using the techniques of the present invention described herein. As a further example, aspects of the present invention described herein, either alone or in combination with other techniques, can be used to perform subsequent tests. In this respect, the sensitivity of the initial screening can be set relatively high, such that it may indicate some false positives, and subsequent application of techniques in accordance with aspects of the present invention described herein can be employed with a higher degree of sensitivity that may provide more detailed information.

In one embodiment, aspects of the present invention can be used to screen a population of at risk individuals (e.g., individuals with genetic or other risk factors for a disease such as cancer, a circulatory disorder, or other disease) to identify the presence of disease indicia in one or more individuals.

In one embodiment, diagnostic methods of the invention are computer-implemented to increase efficiency and throughput, and reduce variability associated with individual physicians. However, as discussed herein, in some embodiments, the final diagnosis may be made by a physician based on information generated by an automated analysis or a structural representation using aspects of the invention described herein.

As shall be appreciated from the foregoing, aspects of the invention can be used on patients known to have a disease, or can be used to screen healthy subjects on a regular basis. A subject can be screened for one or more diseases. Screening can be done on a regular basis (e.g., weekly, monthly, annually, or other time interval); or as a one time event. Different conditions can be screened for at different time intervals and in function of different risk factors (e.g., age, weight, gender, history of smoking, family history, genetic risks, exposure to toxins and/or carcinogens etc., or a combination thereof).

In one embodiment, aspects of the invention can be employed to diagnose, evaluate or stage diseases associated with changes in vasculature structure. The detection of small changes in vasculature structure may be informative for early stage disease detection and disease monitoring. A morphological determination of binned blood vessels may be analyzed and one or more patterns (e.g., individual structural features or distributions) may be evaluated for the presence of abnormal properties. In one embodiment, a vasculature structure may be obtained including a series of interconnected branched blood vessels and may include arteries, arterioles, veins, venules, capillaries, and other sized blood vessels. However, according to aspects of the invention, an interconnected vasculature structure is not required and different sizes of blood vessels can be analyzed separately and represented on a histogram or other form of distribution representation. In some aspects of the invention, blood vessels of the entire body can be analyzed, and in other aspects the blood vessels of a target organ, tissue, or part thereof can be analyzed. In some aspects of the invention, only a subset of blood vessel sizes is binned and analyzed (e.g., blood vessels with a diameter below about 500 microns, preferably below about 200 microns, more preferably below 100 microns, even more preferably below 50 microns, and even more preferably below 25 microns). In one embodiment, only capillary blood vessels are analyzed. In another embodiment, capillaries and small arteries and veins (e.g., arterioles and venules) are analyzed. For example, an arborescent vasculature can be analyzed in any tissue where it is found (e.g., an arborescent mucosal vasculature such as the oesophageal arborescent mucosal vasculature).

The branches of a vascular tree may be analyzed to glean information about the status of the patient. In one embodiment, the branches of a vascular tree may be followed to identify specific regions where certain characteristics of angiogenesis may be evaluated (e.g., start with a large branch and follow the tree to second, third, or fourth, or subsequent levels of branching to identify small blood vessels that may have abnormal structures if they are providing a blood supply associated with a disease). Alternatively, several different blood vessel sizes in the vascular tree may be evaluated for signs of angiogenesis. In another embodiment, the overall branching pattern of a vascular tree can be analyzed. For example, a healthy vascular tree may be approximately hierarchical in that the size of the blood vessels generally decreases as the vessels branch. In contrast, a diseased (e.g., angiogenic) vascular tree may be less hierarchical with areas of significant blood vessel branching with little or no decrease in blood vessel size. It should be appreciated that the nature and extent of the analysis may depend on the goal of the diagnostic evaluation. For example, a full body scan can be evaluated selecting all vascular structures and analyzing the entire vascular network for signs of different diseases. Alternatively, a region of a body suspected of being diseased may be selected and the data may be processed to focus on the vasculature in that region (e.g., to obtain a segmented representation of structures in the region of interest). A region of interest may be an organ (e.g., pancreas, liver, breast, colon etc.) or a tissue (e.g., skin epidermal tissue). The presence of an abnormal vasculature structure can be an early indication of a range of diseases for which early detection is critical for effective treatment.

Diseases associated with changes in vascular structure (e.g., that can be detected by the presence of abnormal vascular patterns at a given time or abnormal structural changes observed as a function of time) include, but are not limited to, cancer, heart diseases and related circulatory disorders, eye diseases, skin disorders, and surgical conditions. For example, diseases and conditions associated with changes in vascular structure include, but are not limited to, tumor angiogenesis, recurrent and progressive cancers, coronary artery disease, cardiomyopathy, myocardial ischemia, arteriosclerosis, atherosclerosis, atherosclerotic plaque neovascularization, arterial occlusive disease, ischemia, ischemic or post-myocardial ischemia revascularization, peripheral vascular disease (including diabetic retinopathy), thromboembolic diseases (e.g., stroke, pulmonary embolism, brain aneurisms, and deep venous thrombosis), claudication, rheumatologic disorders (e.g., arthritis), immune disorders (e.g., rheumatoid arthritis, vasculitis, Wegner's granulomatosis, and systemic lupus erythematosis (SLE)), pulmonary disorders (including, emphysema, COPD, idiopathic pulmonary fibrosis, pulmonary arterial hypertension, and other respiratory disorders), myeloma, vascular proliferative disorders, gastrointestinal disorders (e.g., Crohn's disease, ulcerative colitis, and inflammatory bowel disease (IBD)), gynecologic disorders (endometrial polyp, vaginal bleeding, endometriosis, dysfunctional uterine bleeding, ovarian hyperstimulation syndrome, preeclempsia, polycystic ovarian syndrome (PCO), cervical cancer, and cervical dysplasia), skin disorders (infantile hemangioma, verruca vulgaris, psoriasis, neurofibromatosis, epidermolysis bullosa, Stevens-Johnson syndrome, and toxic epidermal necrolysis (TEN)), eye disorders (macular degeneration, maculopathies, diabetic retinopathy, and retinopathy of prematurity (retrolental fibroplasia)) wound healing, inflammation associated with immune responses, ischemia including limb ischemia and cardiac ischemia, Alzheimer's disease and other disorders such as wound dehiscence, Buerger Disease (thromboangitis obliterans, arteriosclerosis obliterans (ASO), ischemic ulcers) multiple sclerosis, idiopathic pulmonary fibrosis, HIV infections, plantar fasciosis, plantar fasciitis, Von Hippel-Lindau Disease, CNS hemangioblastoma, retinal hemangioblastoma, thyroiditis, benign prostatic hypertrophy, glomerulonephritis, ectopic bone formation, and keloids.

These different diseases are characterized by different changes in vasculature structure. Accordingly, in one aspect of the invention, parameters and scoring methodologies are used to detect, diagnose, and monitor particular diseases and their related therapies based upon particular characteristics of vasculature structure indicative of the disease. Even within each disease category, different diseases can be characterized by different changes in vasculature to structure. Accordingly, structure mining and scoring can be fine-tuned to increase the sensitivity for particular types of disease within a category (e.g., lung cancer score, breast cancer score, etc., can be developed). Patient-specific scoring parameters can also be developed to follow the progression of a specific disease or disorder in a patient.

Structural vasculature changes include changes in vascular architecture and vascular morphology affecting blood vessels and/or lymph vessels. Structural changes can involve neovascularization (including the growth of large blood vessels (e.g., arteriogenesis) and the growth of microvasculature (angiogenesis)), large blood vessel expansion, and vascular necrosis. Angiogenesis involves the formation of new blood vessels that sprout from preexisting blood vessels. Angiogenesis is different from vasculogenesis, which is the de novo formation of vessels that occurs primarily during development. Vasculogenesis is rarely associated with a disease or disorder. However, aspects of the invention can be used to study the natural process of vasculogenesis to help identify and understand defects in de novo blood vessel formation.

Angiogenesis is often associated with tumor growth and is a useful biomarker for cancer. Angiogenesis also can be associated with conditions where new blood vessel growth occurs in response to a reduced oxygen supply or blood flow (whether due to thrombosis, embolism, atherosclerosis, or other chronic occlusion or narrowing of the vasculature). Certain respiratory, cardiovascular, and inflammatory disorders also are associated with angiogenesis.

Angiogenic blood vessels have structural characteristics that are different from those of established blood vessels. For example, the branching patterns and tortuosity of angiogenic blood vessels are very different from those of normal blood vessels. These and other structural features are found predominantly in microvasculature and can be used for mining and scoring vasculature structural images. However, changes in larger blood vessels such as arteries and veins also may be associated with certain diseases or disease stages (e.g., growth and development of large tumors or late-stage tumors).

The vasculature that supports a tumor is typically associated with the connective tissue of the tumor (the stroma) that supports the malignant cells (in the parenchyma). As discussed herein, tumor blood vessels are irregularly spaced and characterized by heterogeneous structural patterns or features. However, the formation of tumor blood vessels and other forms of angiogenesis may involve a series of characteristic stages (see, for example, Dvorak, 2003, American Journal of Pathology, Vol. 162:6, pp. 1747-1757, the disclosure of which is to incorporated herein by reference in its entirety). Early stage angiogenesis may be characterized by vascular hyper-permeability, fibrin deposition and gel formation, and edema. This may result in the enlargement of micro-vessels such as venules. The cross-sectional area of an enlarged micro-vessel may be about 4 fold that of a normal micro-vessel. The perimeter of an enlarged micro-vessel may be about 2 fold that of a normal micro-vessel. Enlarged micro-vessels may occupy about 4-7 fold the volume of normal micro-vessels in a region of active angiogenesis. The appearance of enlarged micro-vessels may be followed by the appearance of "mother" vessels that are enlarged, thin-Walled, serpentine, and hyper-permeable. Mother vessels may undergo a process of bridging whereby trans-luminal bridges are formed dividing the blood flow within the vessel into smaller channels. A developing mother vessel also may contain one or more glomerular bodies that may expand to divide the lumen of the mother vessel into several smaller channels that are typically tortuous. Bridging and glomerular body formation in mother vessels may lead to the appearance of small capillaries characteristic of angiogenesis. However, certain mother vessels persist as abnormally enlarged vessels with thin walls. These vascular malformations are often characterized by the presence of an asymmetric muscular coat and perivascular fibrosis. Small arteries and arterioles also may increase in size in diseased tissue. Aspects of the invention include detecting and/or monitoring any one or more of the blood vessel structural changes described herein. In one embodiment, the presence of one or more patterns (e.g., individual structural features or distributions) characteristic of new blood vessel formation may be used to detect or monitor a disease. In another embodiment, the presence of one or more specific patterns (e.g., individual structural features or distributions) may be used to determine the stage of angiogenesis (e.g., early-stage, mid-stage, late-stage, etc.) in a body region.

Accordingly, abnormal changes in blood vessel size (diameter and/or length) can be early signs of diseases such as cancer or other disease associated with an increased blood supply. Changes in blood vessel size may occur before any structural signs of angiogenesis appear. In one embodiment, aspects of the invention are useful to detect blood vessels (e.g., capillaries) that are swollen and/or longer than normal. For example, aspects of the invention are useful to detect abnormally long intrapapillary capillary loops in situ (e.g., associated with early stages of cancer in oesophageal mucosa).

In some embodiments, blood vessel changes indicative of necrosis in tumor tissues may be indicative of the aggressiveness of the tumor tissue and/or the likelihood of metastasis, and/or the responsiveness to therapy, and/or the efficacy of a therapeutic treatment (e.g., a candidate drug), and/or an therapeutic treatment selection and/or modification (e.g., a change in drug or dose for an individual patient). Accordingly, in situ patterns (e.g., individual structural features or distributions) indicative of necrosis may be useful biomarkers for patient prognosis. In certain embodiments, necrosis within a region of a tumor may be indicated by one or more of the following patterns (e.g., individual structural features or distributions) within that region: a collapse in blood vessel structure, poor vascularization (e.g., a low blood vessel density relative to other regions of the tumor or relative to the perimeter of the tumor), a change in blood vessel size or shape over time, a lower than threshold number of blood vessels, blood vessels (e.g., in the microvasculature or the capillaries) that are separated by a greater than threshold distance (e.g., by more than 100 microns; more than 150 microns, or more than 200 microns) within a volume of the tumor, micro-vessel diameter and/or density indicative of undervascularization, etc., or any combination thereof. In some embodiments, a volume of avascularization or undervascularization may be evaluated or quantified and used as an indicator of necrosis. It should be appreciated that other indicia of necrosis may be used, alone or in combination with blood vessel features. Other indicia may include indicia of tissue collapse or cavitation that may be visualized (e.g., using CT etc.) and/or indicia of tissue viability using one or more markers of metabolic activity (e.g., ones that may be analyzed using a PET scan, etc.).

Aspects of the invention may be used for the detection (e.g., the automatic detection) of necrotic areas in a subject (e.g., in a tumor in a subject). A necrotic region is an avascular region within the boundary of a diseased tissue. Methods of the invention may be used to detect (e.g., automatically) the transition between the vascularized diseased tissue and avascular region that defines the boundary of the necrotic region.

Aspects of the invention also may be used to detect or evaluate (e.g., automatically) a response to therapy. For example, a response to therapy (e.g., to a specific drug and/or a specific dosage of a drug, and/or to a combination of drugs and specific dosages of these drugs, etc.) can be detected and assessed as follows. Changes in the vascular patterns (e.g. vessel normalization/straightening, disappearance of smaller diameter vessels leading to lower micro-vessel density and to skewing of the vessel diameter distribution towards the larger vessels) may be detected and/or evaluated within the volume defined by the boundary of the diseased tissue and the boundary of the necrotic area. An increase in the absolute volume size of the necrotic area and/or the rate of such change while the total volume of the disease (e.g. tumor) volume stays constant may be detected and/or evaluated as an indicator that the therapy is effective. An increase in the ratio between the absolute volume size of the necrotic area and the total disease (e.g., tumor) volume and/or the rate of change in this ratio may be detected and/or evaluated and used as an indicator that the therapy is effective. A ratio of the diseased tissue volume and the necrotic region volume may be detected and/or evaluated and when it approaches 1 and the overall diseased tissue volume starts shrinking it provides an indication that a therapy is effective.

Accordingly, in some embodiments a binned analysis may be predictive of a response to therapy.

In certain embodiments, a binned analysis may be sensitive to vasculature changes resulting from unwanted side-effects associated with one or more therapeutic drugs. Accordingly, binned analysis may be used to detect or quantify toxic side-effects of certain drugs.

The morphology of binned blood vessels can be mined to identify and evaluate certain patterns (e.g., individual structural features or distributions) that can be used to provide a score that is related to the probability that the blood vessels are normal or abnormal (e.g., disease associated). Patterns (e.g., individual structural features or distributions) for scoring blood vessels include, but are not limited to, the following: diameter, curvature, tortuosity (including, for example, the degree of tortuosity, the length of the blood vessel along which abnormal tortuosity is observed, etc.), variability or heterogeneity (including spatial variability or heterogeneity over distance or in a volume), branching shape or pattern, branching density, branching hierarchy, blood vessel density, distribution of vessel size (ratio of microvasculature to macrovasculature) a field effect (the presence of blood vessels bending towards a specific region), blood vessel diameter distribution, variability of the geometric orientation of blood vessels or fragments thereof, and the distribution of the orientation(s) within a field. The score may have more significance if two or more (e.g., 3, 4, 5, 6, 7, 8, 9, 10, or more, or all) of these parameters are evaluated. In some embodiments, a score is generated using one or more of these structural parameters combined with additional information such as patient-specific medical information (e.g., age, weight, height, gender, etc.) and the presence of one or more additional indicators of disease such as a visible lesion on an X-ray or other image. In some embodiments, a score can be provided for a tumor. An example of a useful score is one that reflects the vascularity of a tumor. An abnormally high vascularity (measured as a higher than normal blood vessel number, density, length, or combination of the above) is generally indicative of a more aggressive or invasive tumor. In one embodiment, vascularity is evaluated by measuring the volume of the lumen of angiogenic vasculature (the volume within the blood vessel tree associated with a tumor). In another embodiment, a measure of vascularity is provided by dividing the volume of the angiogenic lumen by the volume of the solid tumor. Additional information can be gleaned from obtaining a score (or other structural evaluation) at two or more times. A changing score (or other structural evaluation) is indicative of an evolving vasculature that could be associated with a disease or disorder. It should be appreciated that the patterns (e.g., individual structural features or distributions) described herein can be identified and analyzed for a field of analysis without imposing a connectivity on the vessels being studied. In some embodiments, it may be sufficient to analyze only fragments of blood vessels in order to detect one or more structural features of individual vessels or geometrical features of a field of vessels that are different from normal features. For example, blood vessel fragments having an average length of 0.5 mm, 1 mm, 5 mm, 10 mm, 50 mm, 1 cm, 5 cm, 10 cm, 50 cm, etc. may be used. However, it should be appreciated that shorter or longer or intermediate lengths may be used. The scoring and mining aspects of the invention described herein can be automated. Accordingly, diseased (e.g., angiogenic) vasculature can be automatically detected amidst normal vasculature. Various vasculature parameters can be automatically detected and scored, either separately or in any combination, including vessel tortuosity, vessel branching, vessel density, and total intra-vascular volume, but the invention is not limited to any particular parameter or combination.

In one embodiment, aspects of the invention can be used to detect blocked blood vessels, and thromboembolic events, including stroke, lung emboli, blocked micro-coronaries, deep-vein thrombosis, etc. Blocked blood vessels can be detected (1) directly by detecting structural changes in the blocked blood vessel (e.g., detecting a clot, wall thickening, or other signs of reduced flow) and/or (2) indirectly by detecting new vasculature that was generated in response to the blockage. In general, the formation of collateral blood vessels is more ordered than angiogenesis associated with cancer. One aspect of the invention described herein also allows clots to be detected in small blood vessels.

As discussed herein, aspects of the invention can be used to screen the entire vasculature structure of a human or other animal to screen for any form of abnormality in any tissue. Alternatively, a subset of the body may be screened. Accordingly, the structures of binned vessels can be analyzed for one or more organs or tissue types. In addition, only a portion of the vessels in any predetermined bin may be analyzed within any target volume as opposed to the entire vascular tree in that volume. This may be done by analyzing structure data focused on the area of interest, or large amounts of structure data may be obtained, but an analysis may be restricted to a subset of the available data. In some embodiments, only a portion of a vascular tree may be binned and/or analyzed, for example only a portion of those vessels that are of a particular size range. In some embodiments, only fragments of a vascular tree are represented and/or analyzed if the fragments are sufficiently informative to provide patterns (e.g., individual structural features or distributions) of interest. Fragments may include branches or may be unbranched. The portion of the vasculature being analyzed may be statistically significant, such that any observation (normal or abnormal) is physiologically significant. For example, branched structures may not be required for the analysis if a sufficient number of vessel substructures are analyzed to confidently detect any other patterns (e.g., individual structural features or distributions) that may be associated with vasculature changes (e.g., angiogenesis) such as high vessel density. In aspects of the invention, vascular patterns may be detected and/or evaluated in situ in a volume of $1$ $mm^3$, $2$ $mm^3$, $5$ $mm^3$, $1$ $cm^3$, $2$ $cm^3$, $5$ $cm^3$, $10$ $cm^3$, etc. However, smaller or larger or intermediate volumes also may be analyzed.

Different tissues and organs have different and characteristic blood vessel patterns (e.g., the lung which is highly vascularized). Accordingly, in one embodiment, structural analyses and associated structural parameters may be optimized for evaluating different tissues.

In some embodiments, scan data is obtained and/or analyzed for one or more organs (e.g., lung, heart, colon, brain, liver, pancreas, kidney, breast, prostate, etc.) or tissue (e.g., skin, bone, etc.) or portion of any of the above.

Brains may be evaluated for signs of brain tumors and/or other neurological disorders that can be associated with changes in vascular patterns. For example, Alzheimer's may be associated with certain vascular abnormalities. In one embodiment, one or more changes in blood vessel pattern (e.g., shape and/or size) may be detected as an indicator of high blood pressure in the brain.

In some embodiments, certain specific regions of organs or tissues are focused on. For example, atherosclerosis is typically found in certain parts of the arterial tree (e.g., bifurcations, side branches, regions opposite flow dividers, and other areas where angiogenesis often occurs in association with atherosclerosis) and certain cancers tend to occur more frequently in certain organ or tissue regions (e.g., colon cancers are not distributed evenly along the length of the colon).

In other embodiments, aspects of the present invention may be used to follow up with individuals who have been identified as having one or more other indicia of disease (e.g., fecal occult blood, a colon polyp, a lung nodule, one or more cysts or other indicia of disease). Aspects of the invention may be used to confirm the presence of a disease, determine a location for the disease-associated lesion, or provide an evaluation or prognosis of a disease. For example, aspects of the invention may be used to determine whether abnormal vasculature is present at the site of a lesion (e.g. a colon polyp, a lung nodule, a bladder cyst, a prostate cyst, a breast cyst, a spot on a mammography, or any other cyst, lump, or spot that may be detected physically, visually, or using any other diagnostic technique) and help evaluate the likelihood of a malignancy (or other carcinogenic disease stage) associated with the lesion. Accordingly, aspects of the invention may be used for virtual malignancy detection (e.g., virtual colonoscopy, virtual colon malignancy detection, virtual bronchoscopy, virtual lung malignancy detection, virtual mammography, virtual cystoscopy, etc.).

In other embodiments, aspects of the invention may be used for screening a cancer patient to evaluate the extent of a cancerous lesion and/or to screen for the presence of one or more metastatic lesions (e.g., one or more loci associated with angiogenesis). A cancer patient may be screened upon initial diagnosis of a primary cancer. In addition or alternatively, a cancer patient may be screened at least once after an initial cancer treatment (e.g., surgery, radiation, and/or chemotherapy). This screening may include the original cancer locus to detect any cancer recurrence. This screening may include similar body tissue to screen for the presence of other lesions in the same tissue or organ (e.g., the entire colon may be screened when a cancerous lesion is detected in one region of the colon, the second breast may be screened when a cancerous lesion is detected in one breast, etc.). This screening also may be extended to the whole body or to one or more other loci suspected of containing a metastatic lesion. In one embodiment, a cancer patient may be screened several times after an initial cancer treatment (e.g., at time intervals of about 6 months, about 1 year, about 2 years, about 5 years, or at other time intervals).

In one embodiment, a follow up procedure may involve screening one or more organs or tissues for the presence of a metastatic lesion. Different cancers may have different characteristic patterns of metastasis. Accordingly, different target loci may be screened for different cancers. For example, metastatic breast cancer typically spreads to the lungs, the liver, bone, and/or the CNS. Therefore, one or more of these tissue types or organs may be screened after a patient is diagnosed with breast cancer. Similarly, other target loci may be screened after a patient is diagnosed with another cancer type. In some embodiments, the entire body of a cancer patient may be screened for indicia of metastasis.

In one aspect, an initial screen may be performed on an entire body, or an entire organ, using a low resolution representation and/or, for example, analyzing only one or two or a small number (e.g., less than five) pattern parameters in order to detect indicia of a disease. Subsequently, the presence and or nature of the disease may be diagnosed using a higher resolution representation and/or, for example, analyzing one or more additional pattern parameters or alternative pattern parameters than those that were analyzed for the initial detection.

It should be appreciated that some or all of the diagnostic aspects of the invention can be automated as described herein.

Aspects of the invention also can be used to identify the location of a disease by locating one or more structural abnormalities associated with the disease. This information can be used to target a biopsy procedure or a treatment (e.g., a treatment with one or more toxic chemicals, radiation, heat, cold, small molecules, gene therapy, surgery, any other treatment, or a combination of two or more of the above) to the precise location of a disease lesion, or for any other purpose.

In one embodiment, an imaging device is connected to a computer that provides a real-time visual display of the disease lesion. In one embodiment, a real-time visual display may be an accurate model of a body region and lesion along with associated vasculature (as opposed to an actual image). This visual information can be used to guide a surgical instrument for a biopsy. Alternatively, the information can be used to guide an invasive (e.g., surgical removal or bypass) or non-invasive (e.g., radiation) treatment procedure to the site of the disease lesion (e.g., tumor or blood clot).

In some embodiments, aspects of the invention may be used to define the boundary between diseased and non-diseased tissues, or between necrotic and non-necrotic tissue, etc., or any combination thereof. For example, a boundary may be identified or defined by analyzing binned data for several areas of interest and identifying adjacent areas having very different blood vessel densities (or differences in other morphological parameters that are associated with disease, necrosis, etc., or any combination thereof.

In one embodiment, aspects of the invention may be used to identify an area of tissue for treatment before the treatment is applied. For example, a treatment target region may be identified by detecting a boundary of chaotic blood vessel structures. The area may be assessed after treatment to confirm that the treatment was appropriately targeted. In one embodiment, a structure may be analyzed pre-operatively to identify the extent of tissue to be removed from a body region. In one embodiment, a body region may be analyzed post-operatively to determine whether any abnormal structures were missed. This may be used to confirm the success of a radiation treatment or a surgical removal of diseased tissue. Alternatively, this may be used to decide on further surgery and/or another form of treatment. In another embodiment, a disease boundary may be defined or depicted by the boundary of abnormal vasculature. A treatment (e.g., radiation therapy, surgery, etc.) may be guided by and/or restricted to a volume encompassed by the disease boundary.

In one embodiment, aspects of the invention can be used to evaluate the success of a surgical implant or transplant. For example, aspects of the invention can be used to evaluate the formation of new blood vessels after an organ or tissue transplant.

In another embodiment, the development of new blood vessels may be monitored after removal of tumor tissue or after a tumor biopsy, both of which may trigger angiogenesis and/or convert a dormant tumor into a malignant tumor.

It should be appreciated that some or all of the interventional aspects of the invention can be automated as described herein.

Aspects of the invention also can be used to optimize a therapeutic treatment for a patient. The extent of disease progression or regression can be monitored in response to different treatment types or dosages, and an optimal treatment can be identified. The optimal treatment may change as the disease progresses. The effectiveness of the treatment over time can be monitored by analyzing changes in disease-associated patterns (e.g., individual structural features or distributions) using the aspects of the present invention described herein.

In one embodiment, a first therapy can be administered and its effectiveness on slowing, stopping, or reversing abnormal blood vessel growth can be monitored either irregularly or at certain time intervals (e.g., daily, weekly, monthly, or other time intervals). In some embodiments, if a first therapeutic regimen does not have a desired effect on disease progression, a second therapeutic regimen can be evaluated. Similarly, additional therapeutic regimens can be evaluated on a patient-by-patient basis. Additionally, the invention can be used to optimize a chosen therapeutic regimen (e.g., optimize dosage, timing, delivery, or other characteristic of a drug or other treatment) by monitoring the effect of minor therapeutic changes and using the conditions that appear to be most effective for the condition and the patient.

When looking at the therapeutic effectiveness of a treatment, disease-specific parameters may be monitored. Of course, all parameters can be obtained and only a subset reviewed. However, it may be more efficient to simply obtain binned data only for those parameters that characterize the disease.

According to aspects of the invention, patterns (e.g., individual structural features or distributions) that are used to detect angiogenic vasculature and other abnormal blood vessels also can be used to monitor a disease response to treatment. For example, the total vascularity or any other volumetric analysis of angiogenic or other diseased vasculature, and the distribution of vessel size (e.g., a ratio of small to large blood vessels) can be used independently or together as indicators of disease progression or regression. In general, microvasculature disappears before macrovasculature if an anti-angiogenic treatment (or other disease treatment) is effective. Therefore, an effective treatment results in a shift in the distribution of blood vessel sizes towards larger vessels. An index of anti-angiogenic activity can be scored as either a loss of small blood vessels or a shift of observed blood vessels towards a single size (or both).

In another aspect, the parameters can be (or include) changes over time. For example, a structure present at a second time can be compared to a structure present at a first time. In one embodiment, a disease may be tracked pre-therapy and/or post-therapy. Naturally, additional time points can be used. The time points may depend on the condition being observed (e.g., is it the progression of a disease that is already identified, is it the screening of patient(s) over time). Time periods can be daily, weekly, monthly, annual, or shorter, intermediate or longer time periods. Time intervals may be a series of regular time periods. However, other time intervals may also be useful. In one embodiment, a patient-specific baseline is established and monitored over time. For example, vasculature changes in the colon, breast, or other tissue or organ can be monitored periodically.

In one aspect of the invention, a type of treatment may be determined by the degree or extent of abnormal vascular structures (e.g., angiogenesis) that is detected at one or more suspected disease loci (e.g., cancerous loci). For example, if a suspected cancerous locus or metastasis is pre-angiogenic or associated with early stage angiogenesis, it may be appropriate to monitor the locus without any form of treatment. However, an appropriate therapy may involve the administration of one or more angiogenesis inhibitors to prevent the formation of any new vasculature. If a suspected cancerous locus or metastasis is associated with mid-stage angiogenesis, an appropriate therapy may be the administration of one or more angiogenesis inhibitors. A patient with mid-stage angiogenesis at a suspected locus also should be monitored so that any further blood vessel development can be treated more aggressively. If a suspected cancerous locus or metastasis is associated with late stage angiogenesis, an appropriate treatment may involve at least one or more of chemotherapy (e.g., cytotoxic chemotherapy and/or hormone-based chemotherapy), radiation, surgery, and/or treatment with one or more angiogenesis inhibitors. However, it should be appreciated that any of the above treatment options may be used to treat a patient with any one or more lesions associated with any degree of angiogenesis.

Examples of angiogenesis inhibitors include but are not limited to 2-methoxyestradiol (2-ME), AG3340, Angiostatin, Angiozyme, Antithrombin III, VEGF inhibitors (e.g., Anti-VEGF antibody), Batimastat, bevacizumab (avastatin), BMS-275291, CAI, 2C3, HuMV833 Canstatin, Captopril, Cartilage Derived Inhibitor (CDI), CC-5013, Celecoxib (CELEBREX®), COL-3, Combretastatin, Combretastatin A4 Phosphate, Dalteparin (FRAGIN®), EMD 121974 (Cilengitide), Endostatin, Erlotinib (TARCEVA®), gefitinib (Iressa), Genistein, Halofuginone Hydrobromide (TEMPOSTATIN™), Id1, Id3, IM862, imatinib mesylate, IMC-IC11 Inducible protein 10, Interferon-alpha, Interleukin 12, Lavendustin A, LY317615 or AE-941 (NEOVASTAT™), Marimastat, Maspin, Medroxpregesterone Acetate, Meth-1, Meth-2, Neovastat, Osteopontin cleaved product, PEX, Pigment epithelium growth factor (PEGF), Platelet factor 4, Prolactin fragment, Proliferin-related protein (PRP), PTK787/ZK 222584, ZD6474, Recombinant human platelet factor 4 (rPF4), Restin, Squalamine, SU5416, SU6668, SU11248 Suramin, Taxol, Tecogalan, Thalidomide, Thrombospondin, TNP-470, TroponinI, Vasostatin, VEG1, VEGF-Trap, and ZD6474.

Some embodiments may include a method of selecting a subject for treatment and/or selecting a treatment or a course of therapy based on the analysis of certain in situ vascular structures. A method may involve analyzing in situ vascular structure(s) in a human subject to obtain, for example, a score. The score may be compared to a control score (e.g., in an apparently healthy population) or to a previous score from a previous analysis on the same subject. The treatment or the course of therapy may be based on such a comparison. In some embodiments, obtaining an analysis of vascular structures is repeated so as to monitor the human subject's response to therapy over time. In some embodiments of this aspect of the invention, the method further comprises measuring a second index of disease in the human subject wherein deciding on the treatment or course of therapy is also based upon the measurement of said second index.

In certain embodiments, patients having a tumor that is under-vascularized (e.g., one that shows signs of necrosis) may be selected for treatment with one or more anti-angiogenic compounds. Under-vascularized tumors may be identified as those that have a low density of blood vessels, or for which the blood vessel diameters are low (e.g., below a threshold number typical of vascularized tumors).

Aspects of the invention also may include monitoring the effectiveness of a therapy by monitoring the presence of blood vessel patterns or features over time. For example, the progressive loss of blood vessels in a tumor in response to treatment may be a sign that a therapy is effective. In contrast, the absence of any impact on vascularization may be an indicator that a treatment is not being effective in a patient and that an alternative therapy should be considered or used.

It should be appreciated that some or all of the therapeutic aspects of the invention can be automated as described herein.

In one embodiment, aspects of the invention can be used to understand structural changes associated with biological processes of interest (e.g., disease development and progression). For example, an animal's vasculature can, be analyzed to identify additional patterns (e.g., individual structural features or distributions or changes associated only with certain binned size ranges) that may be associated with wound healing or different diseases or different disease stages. These additional patterns (e.g., individual structural features or distributions) may be used in one of more of the diagnostic, intervention, therapeutic, and development aspects of the invention.

In one embodiment, aspects of the invention can be used to understand structural changes associated with medical procedures. For example, an animal's vasculature can be analyzed to identify changes associated with post-surgical wound healing or implant/transplant (including xenografts) growth or rejection.

It should be appreciated that some or all of the research aspects of the invention can be automated as described herein.

In another embodiment, aspects of the invention can be used in screens of compound libraries or to validate candidate compounds for treating diseases associated with abnormal internal structures (e.g., abnormal tubular networks). Aspects of the invention allow efficient high throughput analyses of internal structural changes using binned data (e.g., BMVD). These changes can act as surrogate markers (biomarkers) for certain diseases. As a result, the screening process can be automated to a large extent, and the time for obtaining results significantly shortened when compared to current validations that often involve waiting for disease symptoms to change and also may require tissue biopsies.

Aspects of the invention may be used for identifying and quantifying vascular patterns (e.g., structural features) that can be used as surrogate markers for diagnostic, therapeutic, and research and development purposes. Surrogate markers are useful for reducing the time of diagnosis, therapy evaluation, and drug development. A surrogate marker can be used as an early indicator for disease diagnosis, disease prognosis, or drug effectiveness, without waiting for a clinical outcome (e.g., increased survival time in response to a drug). So, a vasculature analysis can be used as a surrogate marker for drug development (in both pre-clinical and clinical trials), for clinical screening (e.g., breast, lung, or colon screening), and for clinical therapy monitoring. For example, binned vasculature structure may be a useful surrogate marker for angiogenesis related diseases such as cancer.

In one embodiment, aspects of the invention provide methods for screening and/or validating candidate compounds or therapies for their effectiveness in treating neo-vasculature formation and/or vasculature pattern changes associated with disease. Aspects of the invention may be used to evaluate individual or small numbers of compounds or to screen libraries to evaluate and/or identify a plurality of candidate compounds (e.g., by administering these compounds, individually or in groups, to an experimental animal such as a mouse and evaluating their effect on angiogenic vasculature). Libraries may contain any number of compounds (e.g., from approximately 100 to approximately 1,000,000) Different types of compounds can be screened, including antibodies, small molecules etc. However, the invention is not limited by the number and/or type of compounds that can be evaluated.

In one embodiment, the effectiveness of a candidate compound can be compared to a reference compound. A reference compound can be any compound with a known effect on a structure. For example, Avastin (Genentech) is a known monoclonal antibody against vascular endothelial growth factor (VEGF) that can be used as a reference to test the effect of a candidate compound on neovasculature growth.

According to aspects of the invention, compounds and therapies can be evaluated in the context of an in-vivo model such as an animal disease model. For example, a mouse with cancer or atherosclerosis can be used to evaluate, optimize, and identify useful therapies. Other animal models also can be used. Aspects of the invention may be useful for high-throughput analyses because they can detect small changes in vasculature and can be used to evaluate a therapy in a short time period with minimal manipulation since little or no invasive procedures are required.

Vascular analysis aspects of the invention can be used on an orthotopic model to test, for example, the effectiveness of a drug in a short period of time. For example, the effect of a candidate drug on angiogenesis in an orthotopic mouse tumor model may be quantifiable after about 5 days (e.g., between 1 and 10 days, depending on the model and the drug). In contrast, a subcutaneous cancer animal model requires approximately one month for tumor growth to be analyzed and compared to controls.

An orthotopic model can be used to model different diseases or clinical conditions. Examples include, cancer, tissue regeneration, wound healing (including healing after traumatic injury, healing after surgical intervention, healing of burnt tissue such as skin), tissue or organ transplant therapy, medical device implant therapy, other conditions associated with neovascularization or changes in normal vascular structure, or any combination of two or more of the above. However, the invention is not limited by the type of orthotopic model or the type of disease or clinical condition that is being analyzed.

A single orthotopic disease model animal may be useful for testing more than one candidate drug molecule since the analysis does not involve sacrificing the model animal. Accordingly, once a test with a first candidate is complete, a subsequent candidate can be evaluated in the same model animal. A series of candidates can be tested in a single model animal, with appropriate controls, provided the model retains features of neovascularization that are necessary for the assay.

It should be appreciated that some or all of the development aspects of the invention can be automated as described herein.

It also should be appreciated that any one or more structural parameters described herein may be evaluated by comparison to a reference parameter. In some embodiments, a reference parameter may be an amount or score for that parameter in a normal or healthy subject. In other embodiments, a reference may represent a diseased condition. In some embodiments, a change or amount of any structural parameter that is correlated or associated with a disease or condition as described herein may be a statistically significant change or difference in that parameter in a diseased or test subject relative to a reference subject. In some embodiments, a difference or change in a structural parameter may be an increase or a decrease in a particular parameter (or a combination of parameters). An increase in a parameter may be at least a 5%, 10%, 20%, 30%, 40%, 50%, 60%, 70%, 80%, 90%, 100%, or greater increase in that parameter in a test subject relative to a reference subject. Similarly, a decrease in that parameter may be at least a 1%, 5%, 10%, 20%, 30%, 40%, 50%, 60%, 70%, 80%, 90%, 100%, or greater decrease of a measure of that parameter in a test subject relative to a reference subject. Once an amount of change or difference in a parameter has been correlated or associated with a disease or condition, that level may be used in subsequent methods according to the invention. Accordingly, in some embodiments, a difference of at least at least 1%, 5%, 10%, 20%, 30%, 40%, 50%, 60%, 70%, 80%, 90%, 100%, or more of any given structural parameter (e.g., tortuosity, density, volume, or any other individual structural feature or distribution of structures or structural features as described herein) within a data bin relative to a reference value may be used as a threshold for methods of the invention. It should be appreciated that higher or lower or intermediate values may be used. It also should be appreciated that different parameters may have different threshold or reference levels. Also, different parameters (and/or different levels for each parameter) may be associated with different conditions or diseases. Accordingly, specific disease or condition values or thresholds may be identified for different parameters or combinations thereof. These threshold values may be used for disease detection, diagnosis, monitoring, or for any other therapeutic, to clinical, or research application described herein (e.g., in automated methods described herein).

It should be appreciated from the foregoing, there are numerous aspects of the present invention described herein that can be used independently of one another or in any combination. In particular, any of the herein described operations may be employed in any of numerous combinations and procedures. In addition, aspects of the invention can be used in connection with a variety of types of images or any dimensionality. Moreover, one or more automatic operations can be used in combination with one or more manual operations, as the aspects of the invention are not limited in this respect.

BMVD results, however obtained, may be used to facilitate the characterization of any of various morphological changes to tissue and/or to assist in assessing the efficacy of treatment using any of the herein described techniques, alone or in combination.

The herein-described embodiments of the present invention can be implemented in any of numerous ways. For example, the embodiments of automatic BMVD may be implemented using hardware, software or a combination thereof. When implemented in software, the software code can be executed on any suitable processor or collection of processors, whether provided in a single computer or distributed among multiple computers. It should be appreciated that any component or collection of components that perform the functions described herein can be generically considered as one or more controllers that control the herein-discussed functions. The one or more controllers can be implemented in numerous ways, such as with dedicated hardware, or with general purpose hardware (e.g., one or more processors) that is programmed using microcode or software to perform the functions recited herein.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed herein. The computer-readable medium or media can be transportable, such that the program or programs stored thereon can be loaded onto one or more different computers or other processors to implement various aspects of the present invention as discussed herein.

It should be understood that the term "program" is used herein in a generic sense to refer to any type of computer code or set of instructions that can be employed to program a computer or other processor to implement various aspects of the present invention as discussed herein. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A method of obtaining micro-vessel density (MVD) measurements from an image of biological vasculature containing a plurality of vessels, the method comprising acts of:
    analyzing a region of interest of the image for each of a plurality of bins, each of the plurality of bins associated with a predetermined range of vessel sizes, the act of analyzing the region of interest including:
        determining which of the plurality of bins that portions of any vessel subject matter identified in the region of interest belong based on a size associated with the respective portions of the vessel subject matter, and associating each portion of the vessel subject matter with the corresponding one of the plurality of bins to which the portion belongs; and
        computing at least one measurement for each of the plurality of bins, the at least one measurement related to the MVD of the portions of vessel subject matter associated with the respective bin.

2. The method of claim 1, wherein the act of computing at least one measurement includes an act of computing, for each of the plurality of bins, a vessel area for the portions of vessel subject matter associated with the respective bin.

3. The method of claim 1, wherein the act of computing at least one measurement includes an act of computing, for each of the plurality of bins, a number of vessels present in the portions of vessel subject matter associated with the respective bin.

4. The method of claim 1, wherein the act of analyzing the region of interest includes an act of dividing the region of interest into a plurality of areas, and wherein the act of computing at least one measurement includes an act of computing at least one measurement for each of the plurality of areas for each of the plurality of bins, the at least one measurement related to the MVD of the vessel subject matter located in the respective area.

5. The method of claim 4, wherein the act of dividing the region of interest into a plurality of areas includes an act of dividing the region of interest, for each of the plurality of bins, into a plurality of areas, wherein a size of the plurality of areas for each of the plurality of bins is selected based on the range of sizes associated with each respective bin.

6. The method of claim 5, wherein the plurality of bins are arranged in a hierarchy and each of the plurality of bins in the hierarchy is associated with a range of successively smaller vessel sizes, and wherein the size of each of the plurality of areas for each of the plurality of bins decreases with the size of the vessels in the corresponding range.

7. A method of automatically obtaining micro-vessel density (MVD) measurements from an image of biological vasculature containing a plurality of vessels, the method comprising acts of:
    automatically identifying a plurality of vessel regions in a region of interest of the image;
    automatically determining a vessel size associated with each of the plurality of vessel regions;
    automatically associating each of the plurality of vessel regions with one of a plurality of bins based on the vessel size associated with the respective vessel region; and
    automatically computing, for each of the plurality of bins, at least one measurement associated with the MVD of vessel regions associated with the respective bin.

8. The method of claim 7, wherein the act of automatically identifying the plurality of vessel regions includes an act of segmenting the region of interest into vessel and non-vessel regions.

9. The method of claim 8, wherein the act of automatically determining the vessel size includes an act of performing radius labeling on the plurality of vessel regions, such that each of the plurality of vessel regions is labeled with a respective radius.

10. The method of claim 9, wherein each of the plurality of bins is associated with a respective range of radii, and wherein the act of automatically associating each of the plurality of vessel regions with one of the plurality of bins includes an act of associating each of the plurality of vessels regions with a respective one of the plurality of bins having the range of radii within which the respective radius lies.

11. The method of claim 10, wherein the act of computing at least one measurement includes an act of computing, for each of the plurality of bins, a vessel area for the portions of vessel subject matter associated with the respective bin.

12. The method of claim 10, wherein the act of computing at least one measurement includes an act of computing, for each of the plurality of bins, a number of vessels present in to the portions of vessel subject matter associated with the respective bin.

13. The method of claim 10, further comprising an act of dividing the region of interest into a plurality of areas, and wherein the act of computing at least one measurement includes an act of computing at least one measurement for each of the plurality of areas for each of the plurality of bins, the at least one measurement related to the MVD of the vessel subject matter located in the respective area.

14. The method of claim 13, wherein the act of dividing the region of interest into a plurality of areas includes an act of dividing the region of interest, for each of the plurality of bins, into a plurality of areas, wherein a size of the plurality of areas for each of the plurality of bins is selected based on the range of sizes associated with each respective bin.

15. The method of claim 14, wherein the plurality of bins are arranged in a hierarchy and each of the plurality of bins in the hierarchy is associated with a range of successively smaller vessel sizes, and wherein the size of each of the plurality of areas for each of the plurality of bins decreases with the size of the vessels in the corresponding range.

16. A non-transitory computer readable medium encoding instructions capable of being executed on one or more processors, the instructions, when executed, performing a method of automatically obtaining micro-vessel density (MVD) measurements from an image of biological vasculature containing a plurality of vessels, the method comprising acts of:
  automatically identifying a plurality of vessel regions in a region of interest of the image;
  automatically determining a vessel size associated with each of the plurality of vessel regions;
  automatically associating each of the plurality of vessel regions with one of a plurality of bins based on the vessel size associated with the respective vessel region; and
  automatically computing, for each of the plurality of bins, at least one measurement associated with the MVD of vessel regions associated with the respective bin.

17. The non-transitory computer readable medium of claim 16, wherein the act of automatically identifying the plurality of vessel regions includes an act of segmenting the region of interest into vessel and non-vessel regions.

18. The non-transitory computer readable medium of claim 17, wherein the act of automatically determining the vessel size includes an act of performing radius labeling on the plurality of vessel regions, such that each of the plurality of vessel regions is labeled with a respective radius.

19. The non-transitory computer readable medium of claim 18, wherein each of the plurality of bins is associated with a respective range of radii, and wherein the act of automatically associating each of the plurality of vessel regions with one of the plurality of bins includes an act of associating each of the plurality of vessels regions with a respective one of the plurality of bins having the range of radii within which the respective radius lies.

20. The non-transitory computer readable medium of claim 19, wherein the act of computing at least one measurement includes an act of computing, for each of the plurality of bins, a vessel area for the portions of vessel subject matter associated with the respective bin.

21. The non-transitory computer readable medium of claim 19, wherein the act of computing at least one measurement includes an act of computing, for each of the plurality of bins, a number of vessels present in the portions of vessel subject matter associated with the respective bin.

22. The non-transitory computer readable medium of claim 19, further comprising an act of dividing the region of interest into a plurality of areas, and wherein the act of computing at least one measurement includes an act of computing at least one measurement for each of the plurality of areas for each of the plurality of bins, the at least one measurement related to the MVD of the vessel subject matter located in the respective area.

23. The non-transitory computer readable medium of claim 22, wherein the act of dividing the region of interest into a plurality of areas includes an act of dividing the region of interest, for each of the plurality of bins, into a plurality of areas, wherein a size of the plurality of areas for each of the plurality of bins is selected based on the range of sizes associated with each respective bin.

24. The non-transitory computer readable medium of claim 23, wherein the plurality of bins are arranged in a hierarchy and each of the plurality of bins in the hierarchy is associated with a range of successively smaller vessel sizes, and wherein the size of each of the plurality of areas for each of the plurality of bins decreases with the size of the vessels in the corresponding range.

* * * * *